United States Patent [19]
Chan et al.

[11] Patent Number: 5,816,539
[45] Date of Patent: Oct. 6, 1998

[54] ORBITAL ASSIST MODULE AND INTERSTAGE

[75] Inventors: Allan L. Chan, Pleasanton; James J. Connors, Santa Clara; Kenneth W. Epstein, San Jose; Robert M. Heath; Gene Spencer Ogden, both of Sunnyvale; Michael B. Prewitt, San Jose; Michael Wong, Santa Cruz; Edward W. Szeto, Fremont; David P. Kennon, Saratoga; Michael J. Vogel, Sunnyvale; Larry Y. Hsu, Fremont; Daniel H. Hada, Cupertino; Douglas B. Pereyda, Los Gatos; Robert J. MacDonald, San Jose, all of Calif.

[73] Assignee: Lockheed Martin Corporation, Bethesda, Md.

[21] Appl. No.: 511,346

[22] Filed: Aug. 4, 1995

Related U.S. Application Data

[63] Continuation-in-part of Ser. No. 198,818, Feb. 18, 1994, Pat. No. 5,529,264.

[51] Int. Cl.$^6$ .......................... B64G 01/40; B64G 01/42; F02K 09/00; B64D 37/04
[52] U.S. Cl. .................. 244/172; 244/63; 244/135 R; 89/1.801
[58] Field of Search .............................. 244/158 R, 169, 244/172, 63, 67, 74, 135 R; 89/1.8, 1.801

[56] References Cited

U.S. PATENT DOCUMENTS

| | | | |
|---|---|---|---|
| H1082 | 8/1992 | Andrew . | |
| 2,604,045 | 7/1952 | Arnold . | |
| 3,199,455 | 8/1965 | Samms . | |
| 3,357,356 | 12/1967 | Bischoff . | |
| 3,362,290 | 1/1968 | Carr et al. . | |
| 3,453,960 | 7/1969 | Qualls . | |
| 3,825,211 | 7/1974 | Minovitch | 244/172 |
| 4,741,502 | 5/1988 | Rosen | 244/172 |
| 4,796,839 | 1/1989 | Davis . | |
| 4,867,357 | 9/1989 | Inglis et al. . | |
| 4,964,340 | 10/1990 | Daniels et al. . | |
| 5,046,426 | 9/1991 | Julien et al. . | |
| 5,072,896 | 12/1991 | McIntyre et al. . | |
| 5,104,067 | 4/1992 | McIntyre et al. . | |
| 5,117,758 | 6/1992 | Renzi | 244/172 |
| 5,129,602 | 7/1992 | Leonard . | |
| 5,141,181 | 8/1992 | Leonard . | |
| 5,143,328 | 9/1992 | Leonard . | |
| 5,167,386 | 12/1992 | Laquer et al. . | |
| 5,172,875 | 12/1992 | Fried . | |
| 5,203,844 | 4/1993 | Leonard . | |
| 5,217,188 | 6/1993 | Thole . | |
| 5,228,642 | 7/1993 | Bright . | |
| 5,263,666 | 11/1993 | Hubert et al. | 244/172 |
| 5,279,484 | 1/1994 | Zimmermann et al. | 244/172 |
| 5,344,104 | 9/1994 | Homer et al. | 244/172 |
| 5,515,209 | 5/1996 | Chicoine et al. | 244/158 R |

FOREIGN PATENT DOCUMENTS

| | | | |
|---|---|---|---|
| 1522555 | 4/1968 | France | 244/172 |
| 1044780 | 10/1966 | United Kingdom | 244/172 |

*Primary Examiner*—Virna Lissi Mojica
*Attorney, Agent, or Firm*—Holme Roberts & Owen

[57] ABSTRACT

An orbital assist module and an interstage for a launch vehicle. The orbital assist module includes a cylindrical outer wall and a support structure secured to an inner surface of the cylindrical outer wall. The support structure defines a plurality of fuel tank supporting zones, at least one of the zones supporting a fuel tank by means of securing formations. A plurality of nozzles are connected to the fuel tanks by means of fuel lines and a plurality of valves are mounted in the fuel lines. The interstage comprises a cylinder having a leading and a trailing end and an explosive connector at the leading end for connecting the interstage to a trailing end of a launch vehicle motor. A connecting bracket is secured to the trailing end of the cylinder for connecting a second launch vehicle motor to the cylinder.

17 Claims, 23 Drawing Sheets

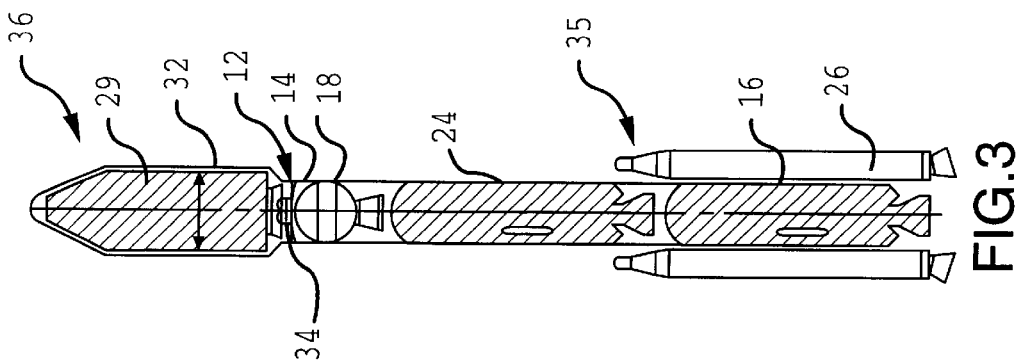
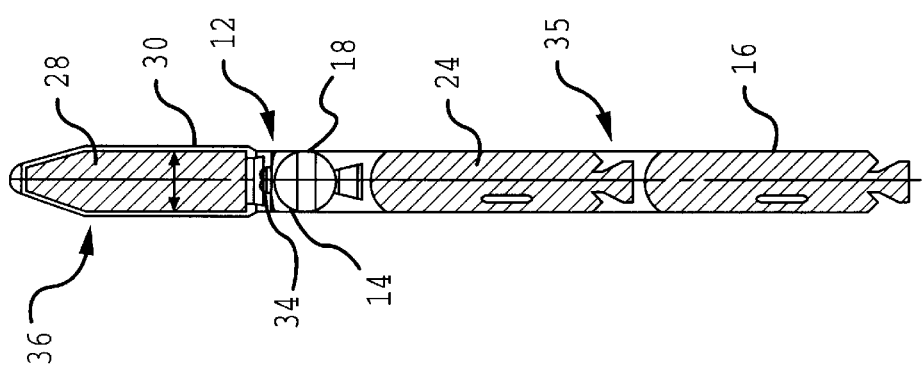
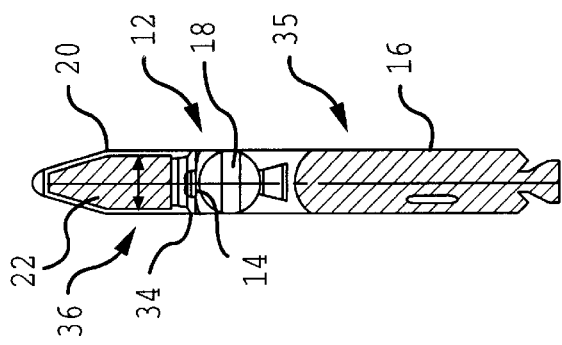

ORBITAL ASSIST MODULE AND INTERSTAGE

RELATIONSHIP TO COPENDING APPLICATION

This patent application is a continuation-in-part of U.S. patent application Ser. No. 08/198,818 filed on Feb. 18, 1994 now U.S. Pat. No. 5,529,264 issued Jun. 25, 1996.

BACKGROUND OF THE INVENTION

It is well known that most liquid propellants provide higher Isp than do solid propellants, and thus are more energy efficient than solid propellants. Liquid propellant rocket engines can be throttled to control the thrust, and in some applications can be stopped and restarted. However for most space booster applications in the payload class of 6000 to 20,000 pounds to Low Earth Orbit (LEO), solid rocket motor space boosters can be as reliable and less costly than liquid propellant boosters.

The inherent simplicity of solid rocket motor boosters reduces the processing times and head count. Liquid propellant boosters inherently require more complex processing procedures resulting in longer processing times and a larger work force at the launch site. Thus the processing component of cost, for solids, is substantially less.

The U.S. Military became the driving force behind the development of solid propellant missiles. The military requirements were, however, substantially different. They emphasized high performance, quick reaction, simplicity, and safety in operations. There were stringent weight, length, and volume constraints, especially for submarine based missiles.

Likewise, because of the ever present requirement in military applications for additional performance within weight and dimension constraints, the missile designers were forced to lighter-weight structures, propellants with higher Isp, reducing inerts to increase the mass fraction of the booster stages, and trimming design and manufacturing margins to the minimum. These measures required additional tests during development and production, more inspections, and certainly a proliferation of documentation verifying the work, all at added expense.

On the other hand, these requirements also spawned substantial advances and developments in materials, ever increasing strength to weight ratios. Metal cases were replaced by glass, to be replaced by Kevlar, in turn to be replaced by graphite-epoxy filament wound cases of ever increasing strength as the technology evolved.

Graphite nozzle throats became carbon-carbon which improved reliability while performance also increased due to reduced throat erosion.

It was recognized that if performance driven requirements such as booster weight and volume constraints could be relaxed, substantial improvements in reliability and lower manufacturing cost could be realized.

It was decided that users' requirements could be met with substantial margin—for spacecraft weight and volume growth during development—by combinations of existing solid fuel rocket motors or motors that were in the process of being developed, and, for example, the use of robust aluminum structure for interstages and equipment sections rather than composites. Since solid rocket motors cannot be readily throttled to achieve flight path adjustment at least some liquid fuel motor facility has to be provided.

The approach proposed for the present invention is to provide an Orbital Assist Module (OAM) having liquid fuel motors. In particular it is proposed to provide a modular system in which a plurality of fuel tanks may be selectively secured in holding zones for the tanks.

Solid rocket motors are initially received at the launch facility. The destruct ordnance is installed and the motors are vertically stacked at the launch pad. The OAM is then mounted on top of the solid rocket motors. The payload (spacecraft) which is previously checked out in a standard facility is installed on the equipment section at that facility. Any payload specific consumables (for example hydrazine for the liquid fuel motors) is loaded at this facility. The fairing (shroud) is installed. The complete assembly is transported to the launch pad, and stacked on the booster. This stacking process is limited to electrical connections, and mechanical mating. Environmental conditioning is provided to the spacecraft if required. The objective is to keep as much activity as possible in existing buildings in a shirt sleeve, floor level environment. This modular approach which includes the use of solid rocket motor sections and an OAM section to provide in flight maneuverability reduces cost by avoiding expensive gantry features. On-the-launch pad checks before the launch countdown are then limited to verifying connectivity.

OBJECTS AND SUMMARY OF THE INVENTION

It is an object of the invention to provide an orbital assist module for a launch vehicle which defines a plurality of fuel tank supporting zones for supporting one or more fuel tanks.

It is a further object of the invention to provide an interstage connectable between rocket motors to reseasably space the motors from each other.

According to the invention there is provided an orbital assist module for a launch vehicle which includes a cylindrical outer wall; a support structure secured to an inner surface of the cylindrical outer wall and defining a plurality of fuel tank supporting zones; at least one fuel tank securable in a supporting zone, each zone defining securing formations for complimentarily receiving a fuel tank; a plurality of nozzles connected to the at least one fuel tank by means of fuel lines; and a plurality of valves mounted in the fuel lines.

The support structure can include a rectangular frame forming a support base, and securing brackets extending outwardly from the frame, in which the frame is secured to the inner surface of the cylindrical outer wall by means of the brackets.

Avionic bay areas can be defined between the securing brackets for housing a guidance, navigation and control system.

The support structure can include two rows of three supporting zones, and wherein the securing formations for each supporting zone comprise four support plates having concave inner edges for complimentarily engaging a cylindrical fuel tank.

Each tank can be made of spun aluminum with a graphite composite over wrap, the tank containing an elastomeric bladder for containing the fuel, and wherein the tank is pressurized with gaseous nitrogen for positive expulsion of the fuel.

The fuel can comprise hydrazine.

The nozzles can include downwardly directed axial thrustor nozzles for velocity addition to the launch vehicle, and outwardly directed thrustor nozzles for pitch, roll and yaw control of the launch vehicle.

The axial thrustor nozzles can include a 50 lbf thrustors and the outwardly directed thrustor nozzles can include a 25 lbf thrusters.

The service valve panel can comprise a plurality of valves connected to the tanks by means of pipes.

Further according to the invention there is provided a launch vehicle including an interstage for connecting two axially aligned launch vehicle booster motors, wherein the interstage includes a cylindrical tube having a leading end and a trailing end, the leading and trailing ends having securing formations for securing the trailing end of the tube to a leading end of a first booster motor of the launch vehicle and the leading end of the tube to a trailing end of a second booster motor of the launch vehicle, the leading end of the tube including an explosive seam for releasing the portion of the tube below the seam from the second motor.

Each booster motor typically has a cylindrical outer wall wherein the trailing end of the cylindrical tube has a diameter which is greater than that of the leading end of the first motor thereby to be received over the leading end of the motor.

The explosive seam can include an annular bracket secured to an inner surface of the leading end of the cylindrical tube, the cylindrical tube having an annular zone of weakening and the bracket having an annular concave section aligned with the zone of weakening, the concave section and cylindrical tube defining an annular housing; and an explosive material housed in the annular housing.

Still further according to the invention there is provided an interstage for a launch vehicle, comprising a cylinder having a leading and a trailing end; explosive connecting means at the leading end for connecting the interstage to a motor of a launch vehicle; and a connecting bracket secured to the trailing end of the cylinder.

The cylinder can comprise a leading section and a trailing section connected to each other, each section comprising a plurality of interconnected segments.

The leading end of the cylinder can define part of the explosive connecting means.

BRIEF DESCRIPTION OF THE DRAWINGS

FIG. 1 is a sectional side view of an LLV1 in accordance with the invention;

FIG. 2 is a sectional side view of an LLV2 in accordance with the invention;

FIG. 3 is a sectional side view of an LLV3 in accordance with the invention;

DETAILED DESCRIPTION OF THE INVENTION

Figure 4:
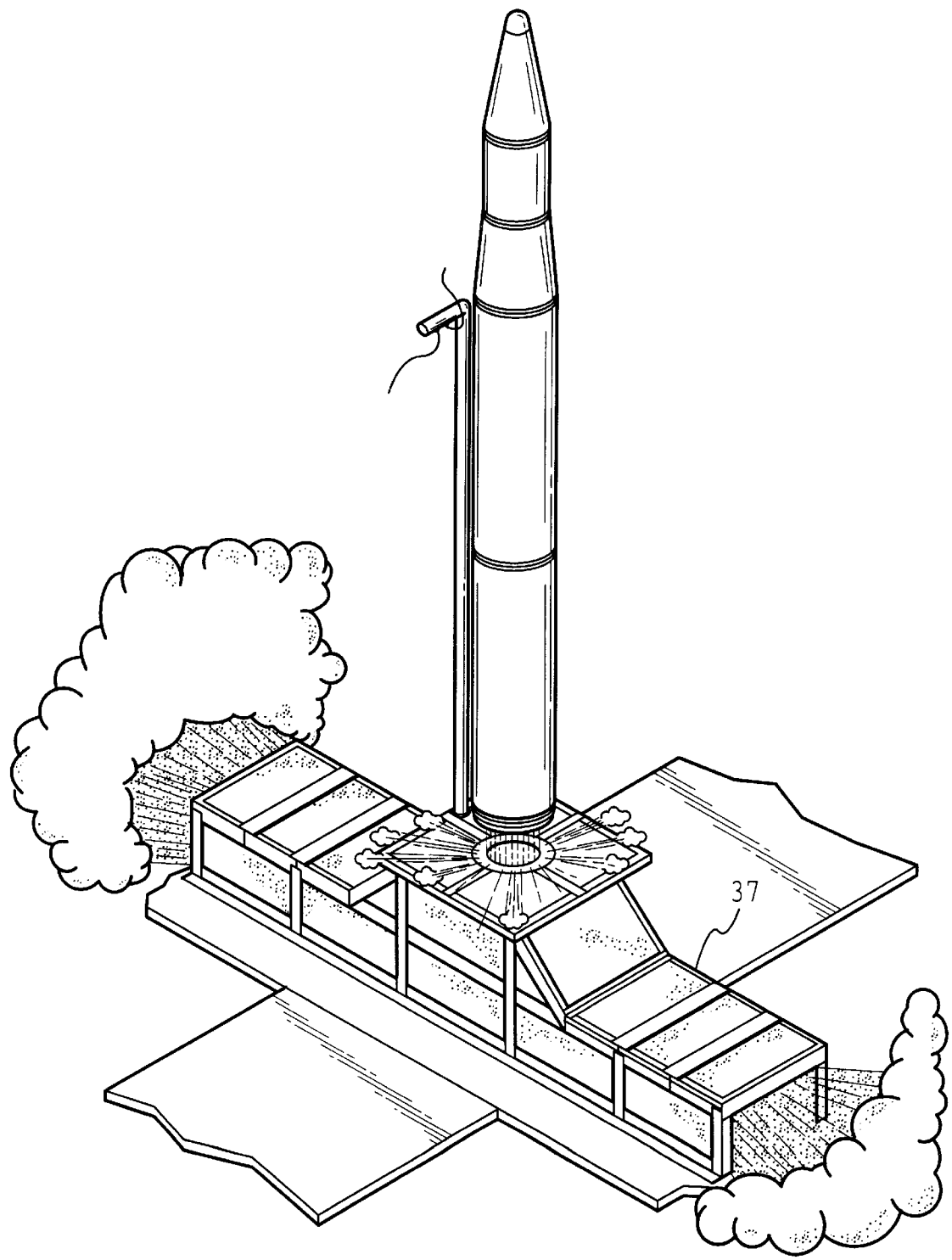
FIG. 4 is a three-dimensional view of a launch vehicle system and portable platform in accordance with the invention.

The rocket systems illustrated in FIGS. 1, 2 and 3 are referred to as the LLV1, LLV2 and LLV3, respectively. Each system is built up in stack-like fashion using standardized modular building blocks. In order to emphasize the use of common building blocks in the three systems, the same reference numerals will be used to refer to the same blocks.

Referring to FIG. 1, the LLV1 system includes an Orbital Assist Module (OAM) 12 having attitude control electronics (not shown) and liquid fuel motors 14. The LLV1 further includes solid fuel rocket motors in the form of a first stage 16 and a final stage 18 on which the OAM is mounted. A payload assembly which includes a shroud 20 (also referred to as a fairing) for housing a payload 22 is mounted on top of the OAM.

The final stage 18 preferably comprises an Orbus 21D solid fuel rocket motor which is manufactured by the Chemical Systems Division of United Technologies, Inc. In the FIG. 1 embodiment, the final solid fuel stage 18 is mounted on top of the first stage.

The first stage primary solid fuel motor 16 which is preferably a solid fuel rocket motor available from Thiokol under the tradename, Castor 120 GT. It is a 120,000 lbm class motor that employs a graphite epoxy resin case, a class 1.3 HTPB propellent, a pyrogen ignitor, and vectorable carbon-phenolic nozzles driven by a cold gas blow down thrust vector control system.

Referring to FIGS. 2 and 3, the first stages are identical to that of the FIG. 1 embodiment and are, accordingly, indicated by the same reference numeral 16. Both the FIGS. 2 and 3 embodiments further include a second stage 24 which preferably also consists of a Thiokol Corporation Castor 120 solid fuel rocket motor. The only distinction between the first stage 16 and the second stage 24 is that the second stage 24 has a larger expansion ratio nozzle to improve performance at higher altitudes. Furthermore, in order to change the burn characteristics, thereby allowing the thrust of the second stage to be tapered near burn-out to lower vehicle acceleration and provide a smoother ride for the payload, the propellent grain is suitably tailored.

In the LLV2 and LLV3, the final stage 18 is mounted on top of the second stage 24. In all three embodiments, however, the final stage 18 is structurally the same, using a carbon phenolic nozzle and an electromechanical actuator.

The embodiment illustrated in FIG. 3 (LLV3) further includes strap-on solid fuel motors 26, preferably being Castor IV A motors, to increase the payload carrying capacity.

It is thus clear that, apart from the Orbital Assist Module 12 which includes the liquid fuel motors 14, the propulsion systems of the various embodiments are of a solid fuel variety.

The LLV1, LLV2 and LLV3 differ in the number of motors making up the system. The purpose is to allow payloads of various sizes to be carried into orbit. Accordingly different shroud sizes are provided to accommodate the different payloads 22, 28, 29 shown for the LLV1, LLV2 and LLV3, respectively. As appears from FIGS. 1, 2 and 3, the shroud 30 of FIG. 2 is larger than the shroud 20 of FIG. 1 but is in turn smaller than the shroud 32 of FIG. 3. While the shrouds 20, 30, 32 are shown specifically for the LLV1, LLV2 and LLV3, respectively, they are interchangeable. The relevant criteria regarding choice of propulsion system and size of shroud are size and mass of the payload.

In each of the three embodiments illustrated in FIGS. 1 to 3 the attitude control system is mounted on top of the final stage 18 and is connected to a shroud, as is discussed in greater detail below. A payload adaptor 34 (discussed below), is provided to mount the payload in its shroud.

The modular system described above allows a stack-and-shoot approach to be adopted during assembly. The solid fuel motors are simply secured together to provide a propulsion system suitable to launch the payload in question.

The rocket system may be considered as consisting of two broad sections: the propulsion system 35, consisting of the solid and liquid fuel motors; and the payload assembly 36 comprising a shroud for housing a payload, and a payload adaptor 34.

As mentioned above, the use of different propulsion systems for the various embodiments provides for different payload carrying capacities. The payload requirements, in turn, account for the different shroud configurations.

The smallest vehicle (LLV1) (illustrated in FIG. 1) is capable of placing up to 2200 pounds into a low earth orbit (LEO) of 100 nautical miles at 28°. The next increment, (LLV2) (FIG. 2) is capable of placing 2200 to 4000 pounds into LEO, and the LLV3 can place 4000 to 8000 pounds into LEO, depending upon the number of strap-on motors 26. Strap-on motors 26 are added in quantities of 2, 3, 4 and 6 to provide performance increases of 1400, 660, 600 and 1100 lb, respectively.

The rocket system configuration provides a number of advantages. The use of solid fuel motors, for instance, permits a stack-and-shoot approach to be adopted. When used in conjunction with a mobile launch system check-out van (not shown), launch operations are even possible from a portable launch platform 37 (FIG. 4). This approach allows the propulsion system and payload assembly to be independently and concurrently assembled, thereafter simply to be mated to each other.

Each part of the rocket system will now be described in greater detail.

Figure 5:
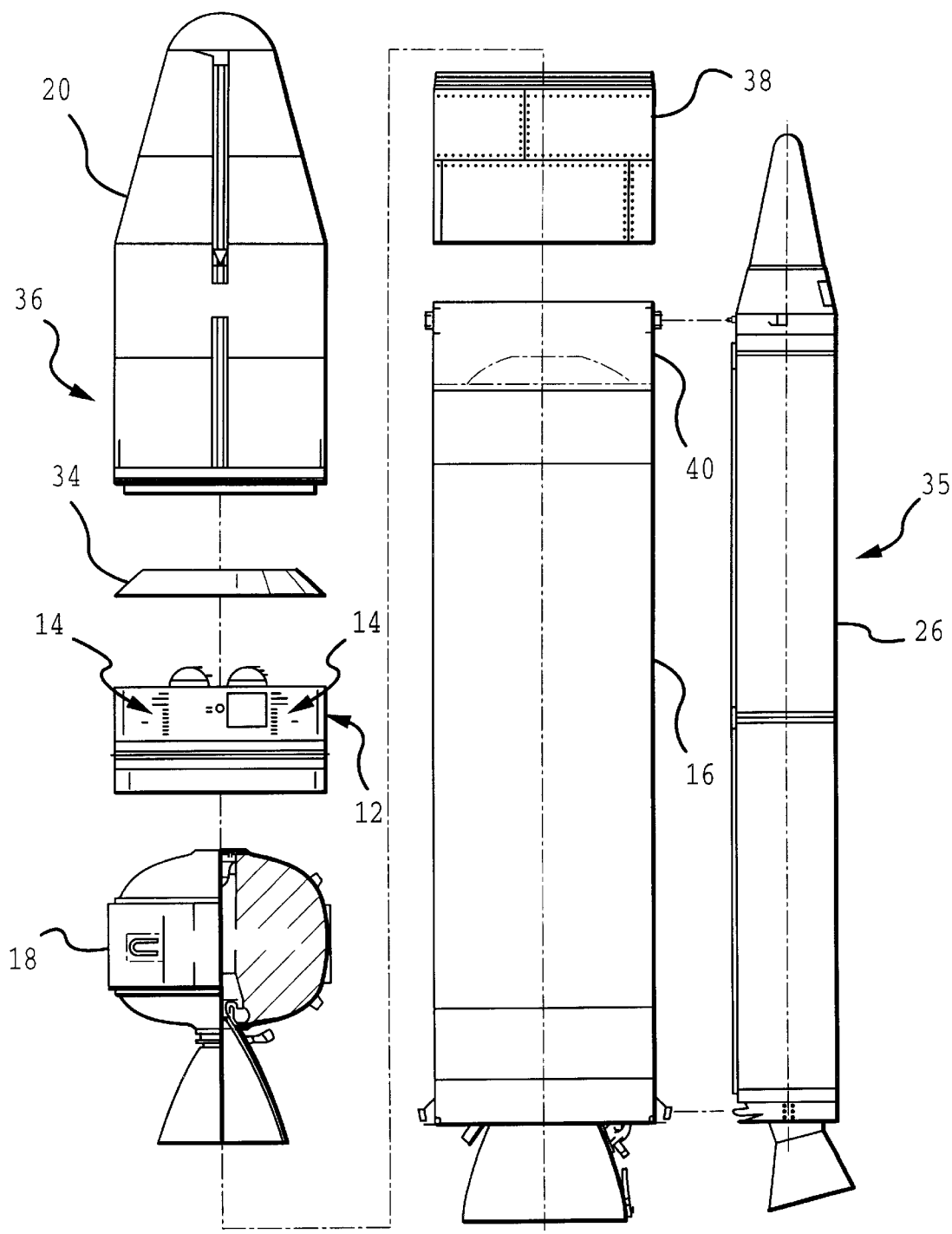
FIG. 5 shows various components of a launch vehicle system in accordance with the invention.

FIG. 5 gives an overview of the various components making up the rocket system, which are shown here in a dismantled state for purposes of clarity. In particular, FIG. 5 shows the propulsion system 35, comprising a first stage 16, a strap-on motor 26, a final stage solid fuel motor 18, an interstage 38 and a connecting ring 40. The illustration further shows the fairing or shroud 20, the payload adapter 34 and the Orbital Assist Module 12 with its liquid fuel motors 14.

Figure 6:
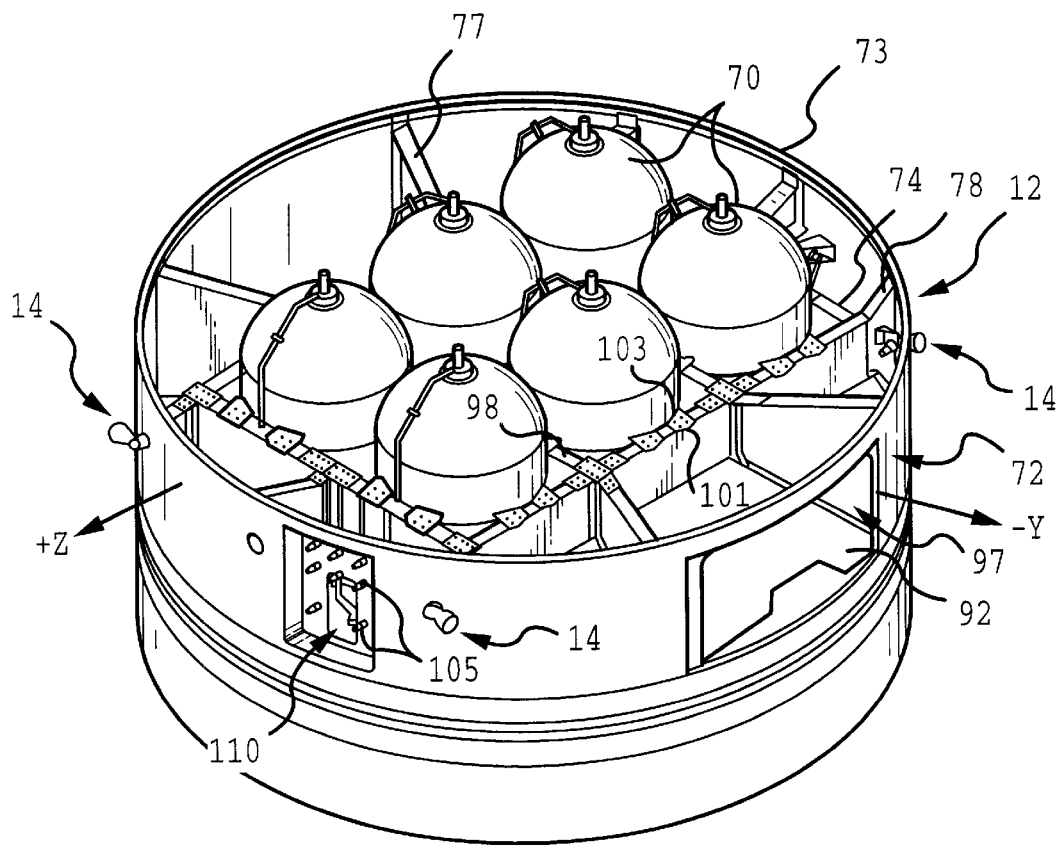
FIG. 6 is a three-dimensional view of an orbital assist module.

FIGS. 6 to 19 illustrate the Orbital Assist Module (OAM) 12 in greater detail. FIG. 6 shows the OAM 12 located above the Orbus 21D 18. It contains the LLV Flight Electronics, Batteries, Telemetry, Inertial Measurement Unit, and the liquid fuel motors 14. The OAM 12 includes a liquid monopropellant hydrazine propulsion system which has 10 rocket engine assemblies for pitch, roll, yaw control and velocity addition to correct for any errors induced during solid rocket motor boost flight. The OAM 12 may be configured with 2, 4 or 6 hydrazine tanks 70 so that the propellant load may be tailored to the specific mission. Fuel load with the modular tanks is 260, 520, and 780 pounds. The attitude control system (tanks and valves) of the OAM 12 is manufactured by the Rocket Research Company which provides four 50 lbf axial thrusters for velocity addition and six 50 lbf thrusters for pitch, yaw and roll control. The hydrazine tanks 70 which are spun aluminum with a graphite composite over-wrap, are each pressurized with gaseous nitrogen or helium to 460 psig and contain an AF-105 elastomeric bladder for positive expulsion of the fuel, i.e. to provide for ullage control. The OAM 12 may use up to 98% of the fuel on board at an average specific impulse of 220 seconds. The total impulse available is 57,200 lbf sec.

Figure 7:
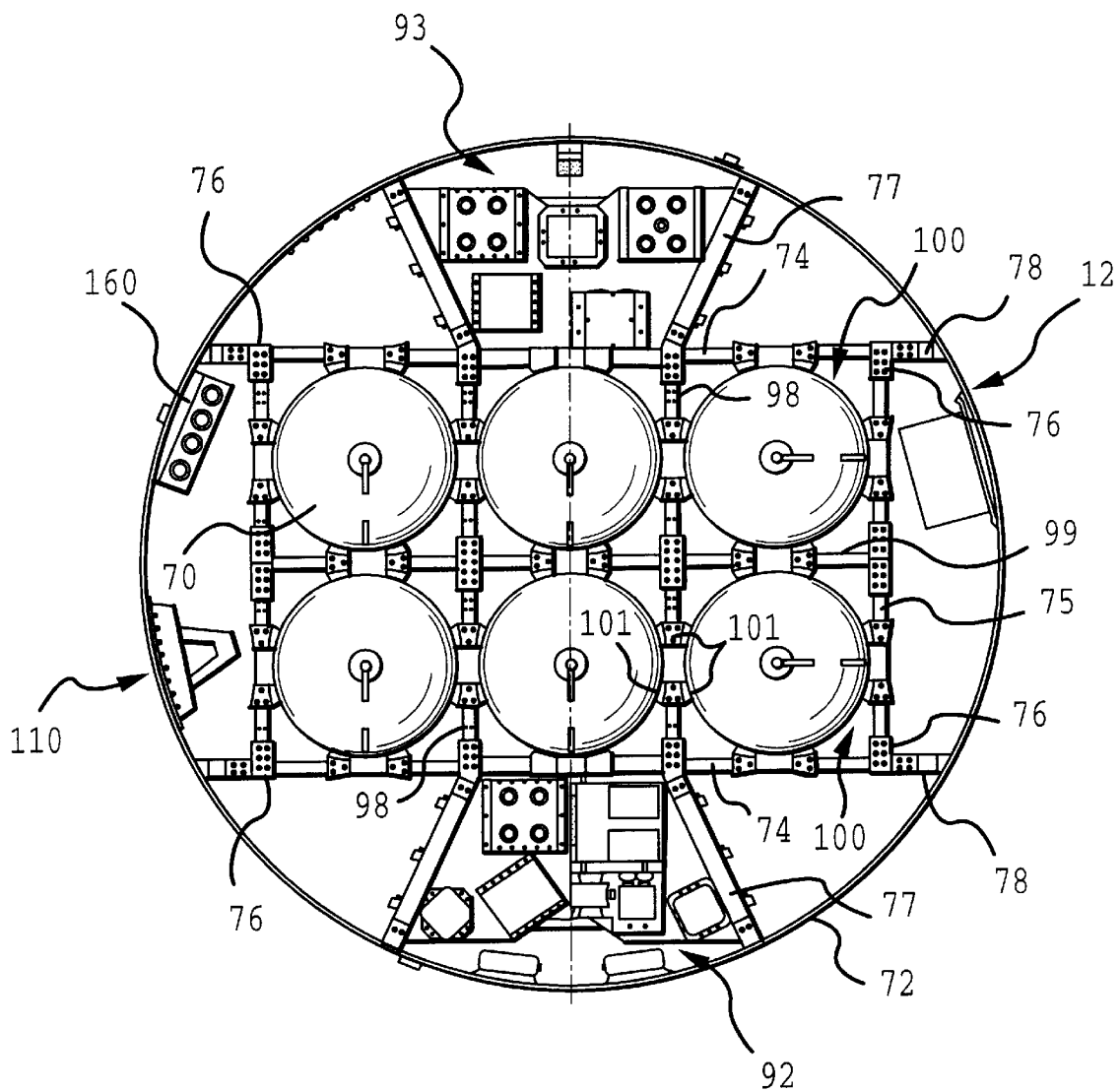
FIG. 7 is a plan view of the orbital assist module of FIG. 6.

Referring specifically to FIGS. 6 and 7, the Orbital Assist Module 12 comprises a cylindrical outer wall 72, the six fuel tanks 70 and a set of 10 liquid fuel motors 14 (not shown in FIG. 7) in the form of thrustors or nozzles. The OAM 12, when viewed from the bottom, shows a set of support brackets to support the six fuel tanks 70. These are best seen in FIG. 7. The brackets form a rectangular fuel tank support base of longitudinally extending brackets 74 and transversely extending brackets 75. The brackets 74, 75 are connected by means of horizontally extending plates 76 secured to the brackets 74, 75 at the corners of the rectangular support base. These are shown more clearly in FIG. 8. The set of support brackets is, in turn, secured to an inner surface of the cylindrical outer wall 72 by means of radially extending brackets 77 and extensions 78 of the longitudinally extending brackets 74. The extensions 78 are secured to the wall 72 in a manner illustrated in FIG. 9. The longitudinally and transversely extending brackets 74, 75 are in the form of 8 inch high I-shaped bars which are connected to each other by means of the plates 76 and vertically extending connector plates 80 which are secured by means of rivets. The extensions 78 include support brackets 82 having strengthening ribs 84, 86. The brackets 82 are riveted to the wall 72 as illustrated in FIG. 9.

Figure 10:
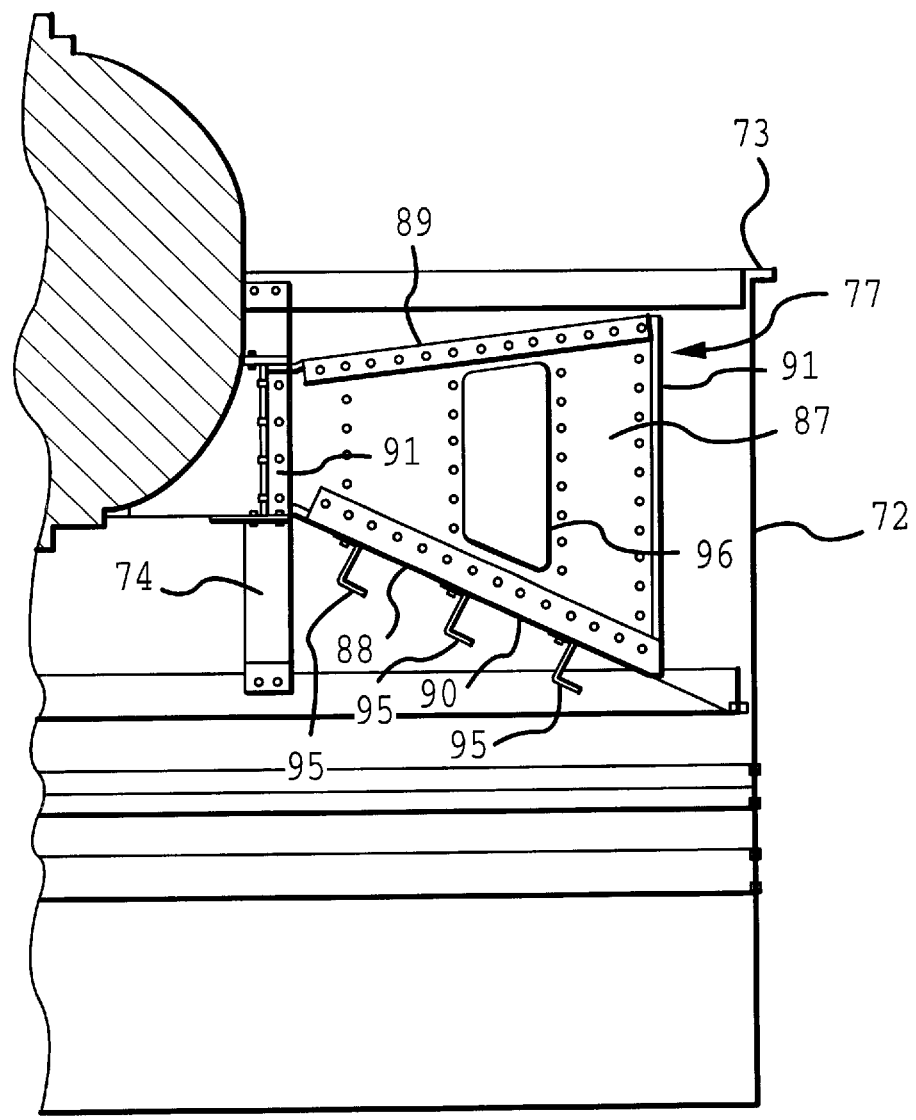
FIG. 10 is a side view of the bracket forming the avionic bay area of the OAM.
Figure 11:
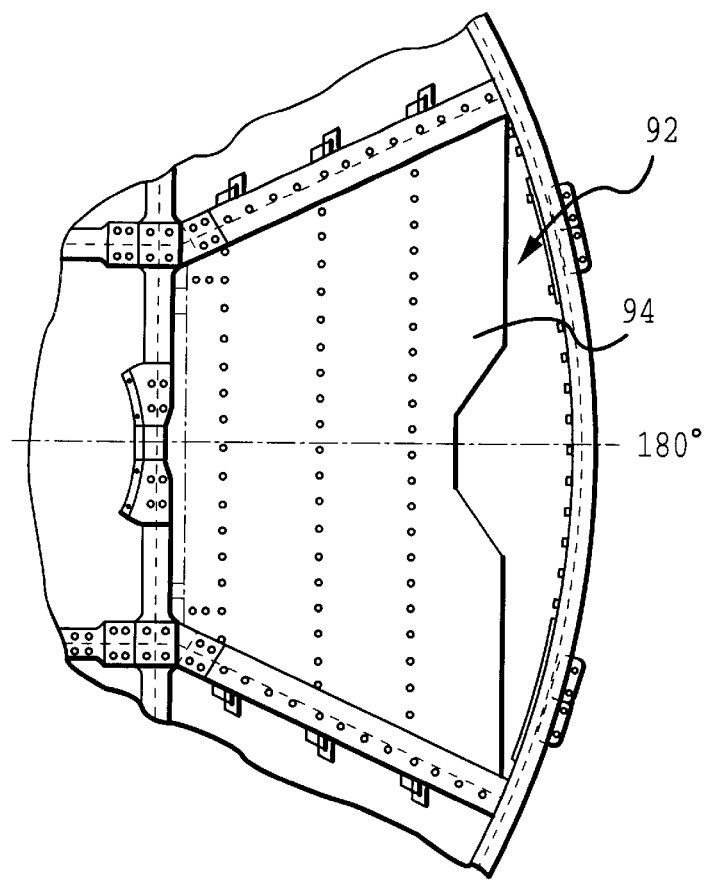
FIG. 11 is a plan view of the avionic bay area.

The radially extending brackets 77 also have an I-shaped cross-section. They flare outwardly as shown in FIG. 10. Each bracket 77 comprises a plate 87 in the form of a trapezium, the lower edge 88 of which forming an angle of 66.8° with the outer parallel side. T-bars 89, 90 are riveted to the upper and lower ends of the plate 87 for greater strength. T-bars 91 are also secured to the parallel sides to serve as connectors to connect the plate 87 to the wall 72 at one end and to a longitudinally extending bracket 74 at the other end.

Avionic bay areas 92, 93 are defined intermediate the radially extending brackets 77 as illustrated in FIG. 7. The avionic bay areas 92, 93 each include a base plate to support the avionics (not shown). For the bay area 92 illustrated in FIG. 11, the base plate is indicated by reference numeral 94. It is structurally supported by three Z-shaped ribs 95 (FIG. 10). An access hole 96 (FIG. 10) is provided in at least one of the plates 87 of each bay area 92, 93 to permit access to the areas adjacent the bay areas. Access to the bay areas 92, 93 is in turn obtained through openings in the wall 72 as shown in FIG. 6 and as indicated by reference numeral 97. Plates (not shown) are secured over the opening in the wall prior to the launching of the launch vehicle.

The support brackets of the rectangular fuel tank support base further include two intermediate transverse extension brackets 98 (FIG. 7) spaced along the brackets 74 and extending between the two brackets 74. Similarly a longitudinally extending bracket 98 is secured between the brackets 75.

Figure 8:
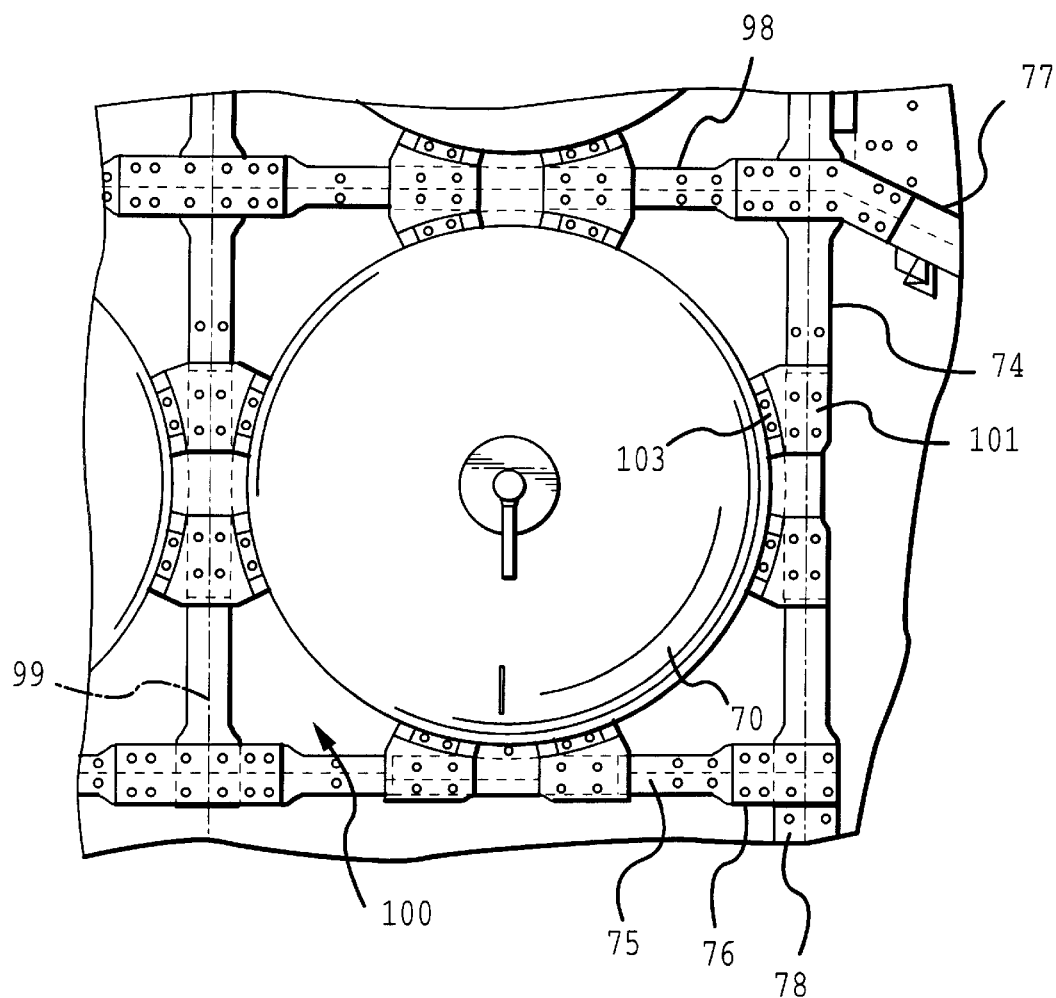
FIG. 8 is a detailed plan view of part of the orbital assist module illustrated in FIG. 7.
Figure 9:
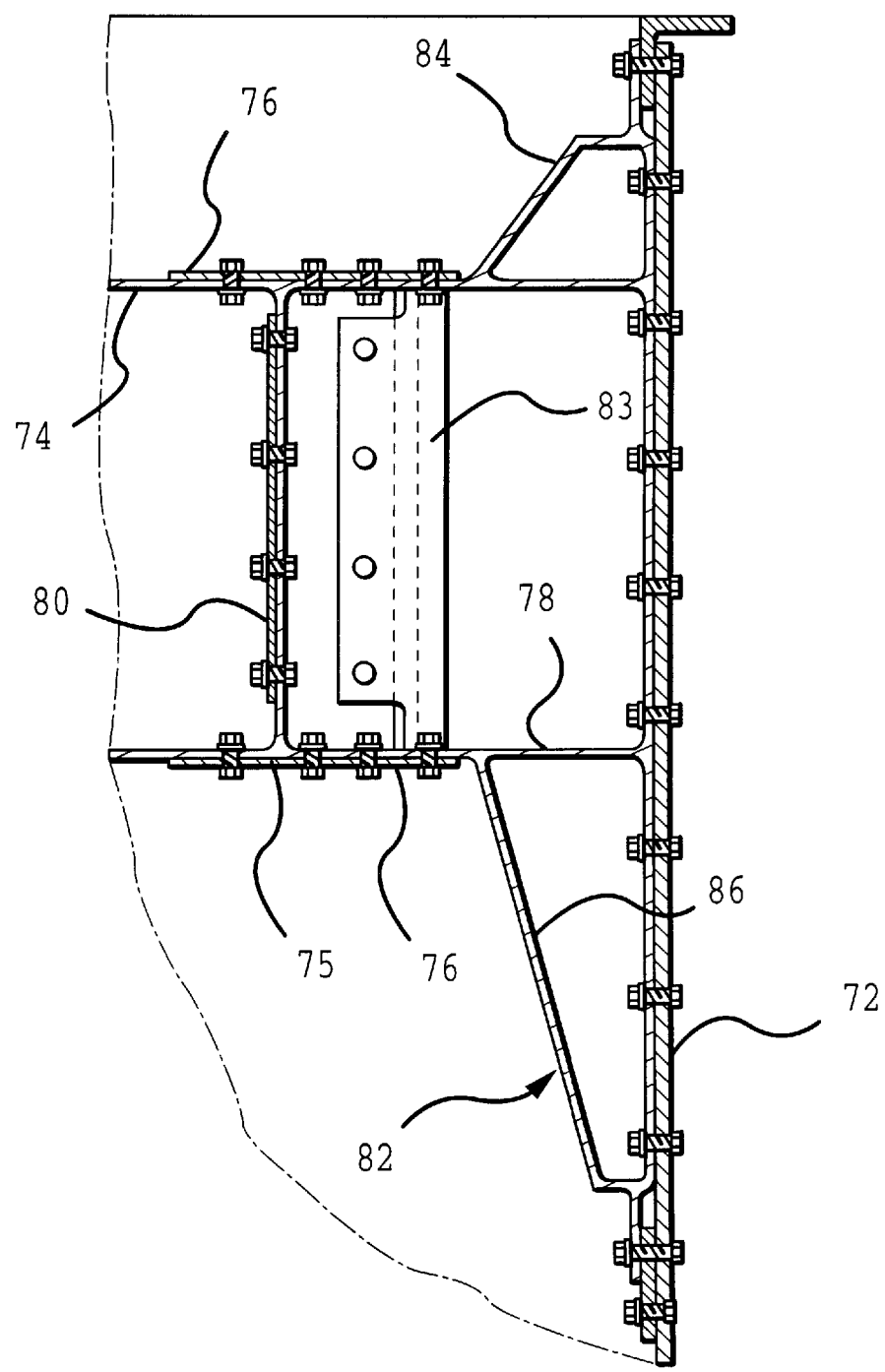
FIG. 9 is a sectional side view of a connection of the support brackets of the OAM to the wall of the launch vehicle.

The brackets 98, 99 are connected at their ends to the abutting brackets 74, 75 by means of plates riveted to the brackets (FIGS. 7 and 8).

Figure 12:
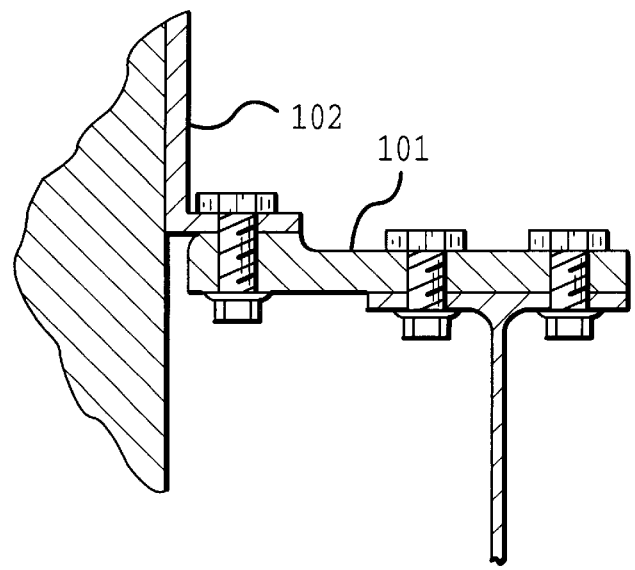
FIG. 12 is a sectional side view of a fuel tank support bracket.

The support brackets thus define six fuel tanks supporting zones 100. Each zone 100 is in the form of a square-walled housing. The fuel tanks 70 are secured in the zones 100 by means of brackets 101 shown in FIG. 8. The brackets 101 are connected to the support brackets by means of bolts and to tank supports which fit snugly around the fuel tanks 70. In this way the tanks are retained in the zones 100. Another embodiment is illustrated in FIG. 12. In this embodiment a single support 102 is provided in the form of a ring while in the embodiment illustrated in FIG. 8, a plurality of supports 103, in the form of discrete plates, are provided.

Figure 13:
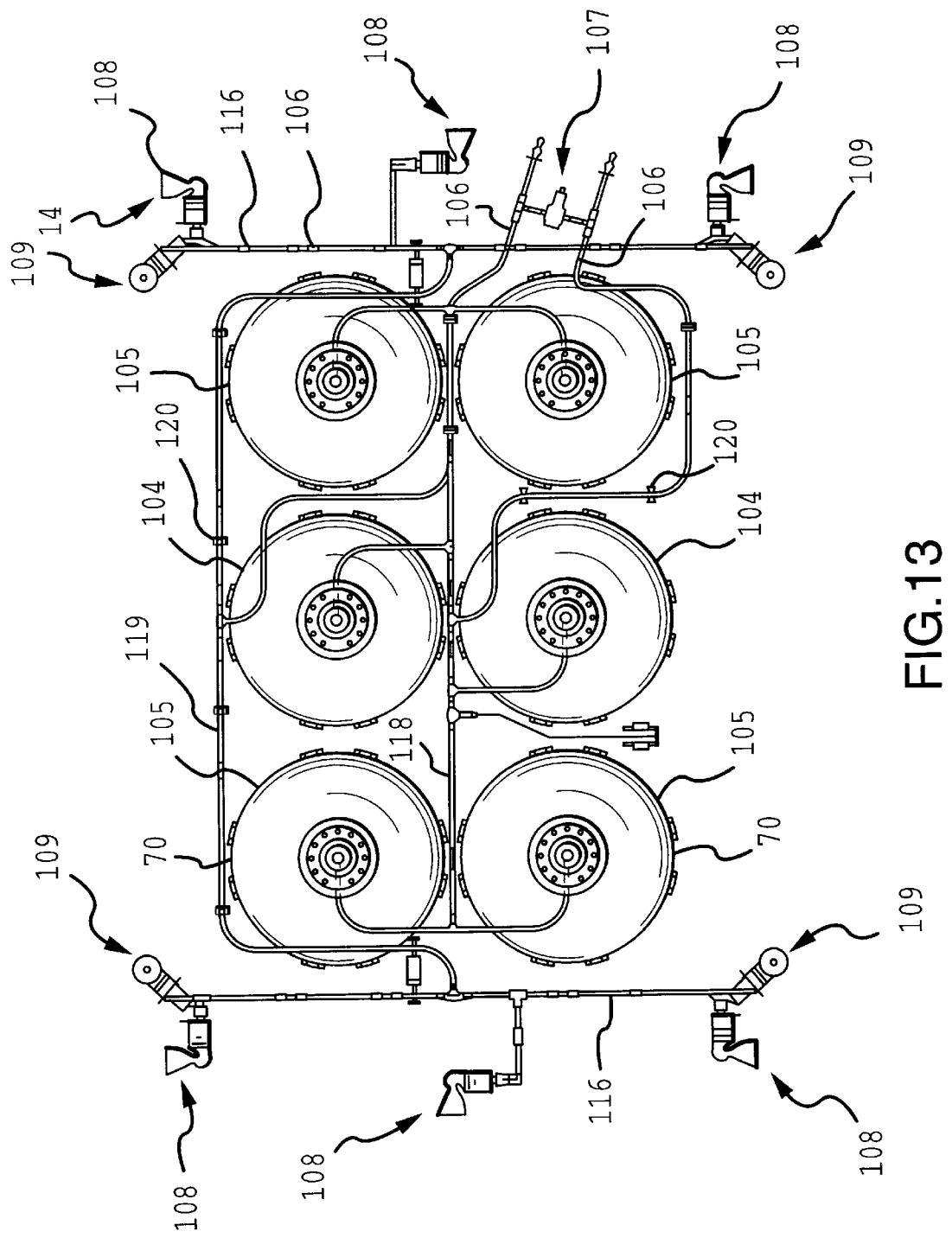
FIG. 13 is a bottom view of the tank and piping arrangement of the orbital assist module of FIG. 6.

FIG. 13 illustrates the tank layout for the various rocket system embodiments. In any one of the LLV1, LLV2 or LLV3 a single pair of tanks 104 can be used. Instead two pairs of tanks 105 can be used or all six tanks 104, 105 can be used. The arrangement will depend on mission performance. A symmetric arrangement is essential in practice to ensure a uniform weight distribution.

Viewed from the side (FIG. 10), the tanks 70 can be seen extending above the ring 73 of the cylindrical outer wall 72.

Figure 14:
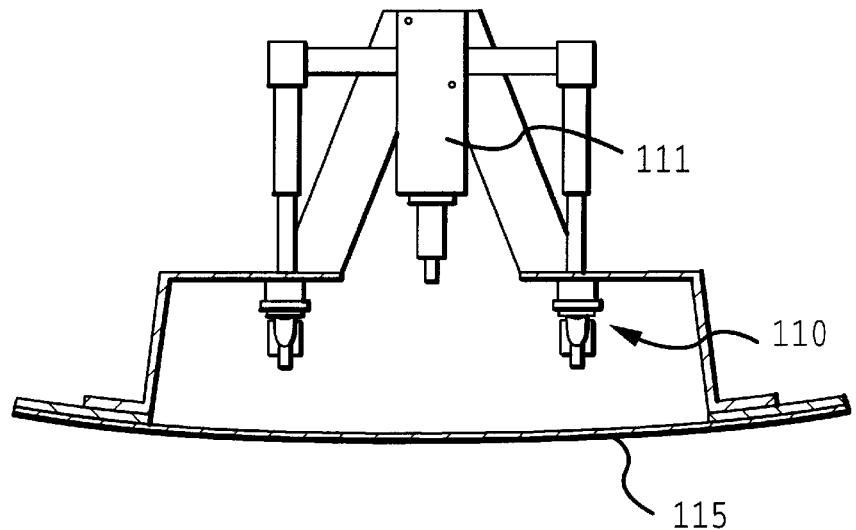
FIG. 14 is a sectional plan view of a portion of the OAM showing a valve arrangement.
Figure 15:
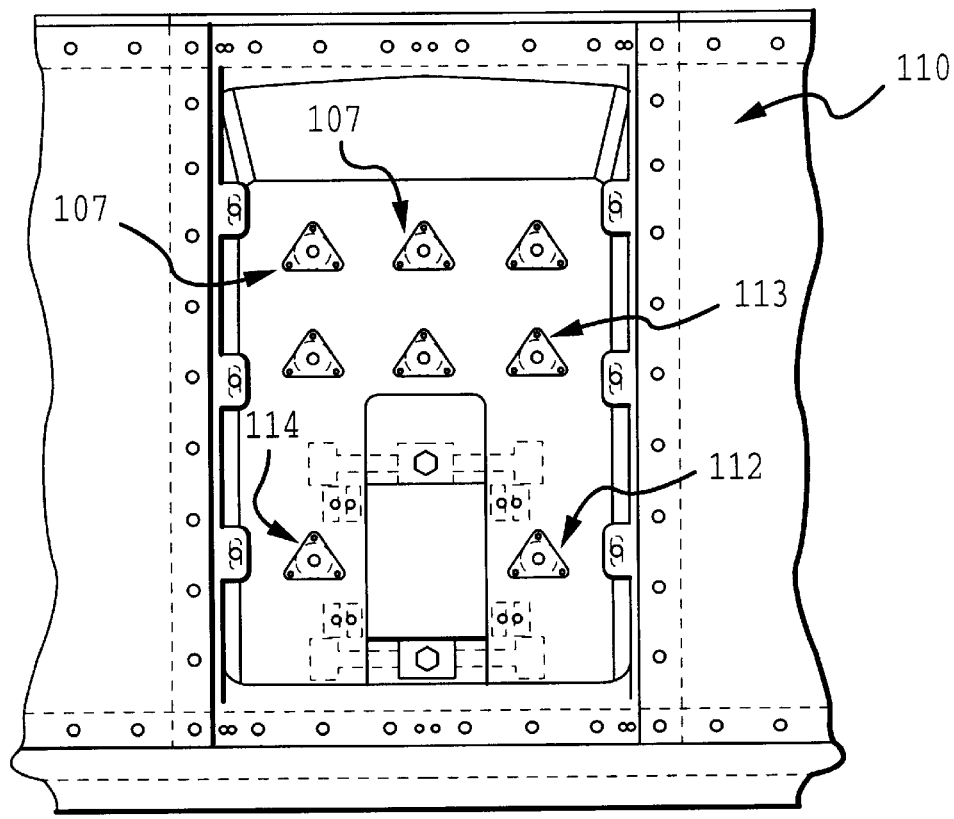
FIG. 15 is a front view of the valve arrangement of FIG. 14 with the cover door removed.

Referring to FIG. 13, a bottom view of the tank arrangement with its associated connector pipes is shown. The pipes 106 pass from valves 107 of a service valve arrangement to each of the tanks 70 in parallel. The piping further includes connections to a set of 10 thrustors or nozzles which constitute the motors 14. Six of the thrustors 108 are for pitch, roll and yaw control and four of the thrustors 109 are for thrust along the longitudinal axes of the system 10. Valves are provided in the pipes 106 to allow the flow path of any of the pipes to be selectively interrupted. A service valve panel 110 shown in FIG. 6, and in greater detail in FIGS. 14 and 15 provides access to the service valves 107 thereby allowing the tanks to be filled and the fuel lines to be selectively opened or closed. FIG. 14 shows a propellant isolation valve 111 to close off fuel flow to the valves 107 once the tanks 70 have been filled. FIG. 15 illustrates a propellant fill/drain valve 112 for filling or draining fuel. Tank pressurization is achieved by means of valve 113 for ullage control as mentioned above. 114 is a thrust service valve. Once the tanks 70 have been filled the service valve panel 110 is closed by means of a door 115, in the form of a plate.

Referring to FIGS. 13, it can be seen that the pipes 116 connected to the thrustors 108, 109 have a smaller diameter than the main supply pipes 118 or the intermediate pipes 119. The pipes are secured to brackets (not shown) by means of clips 120.

Figure 16:
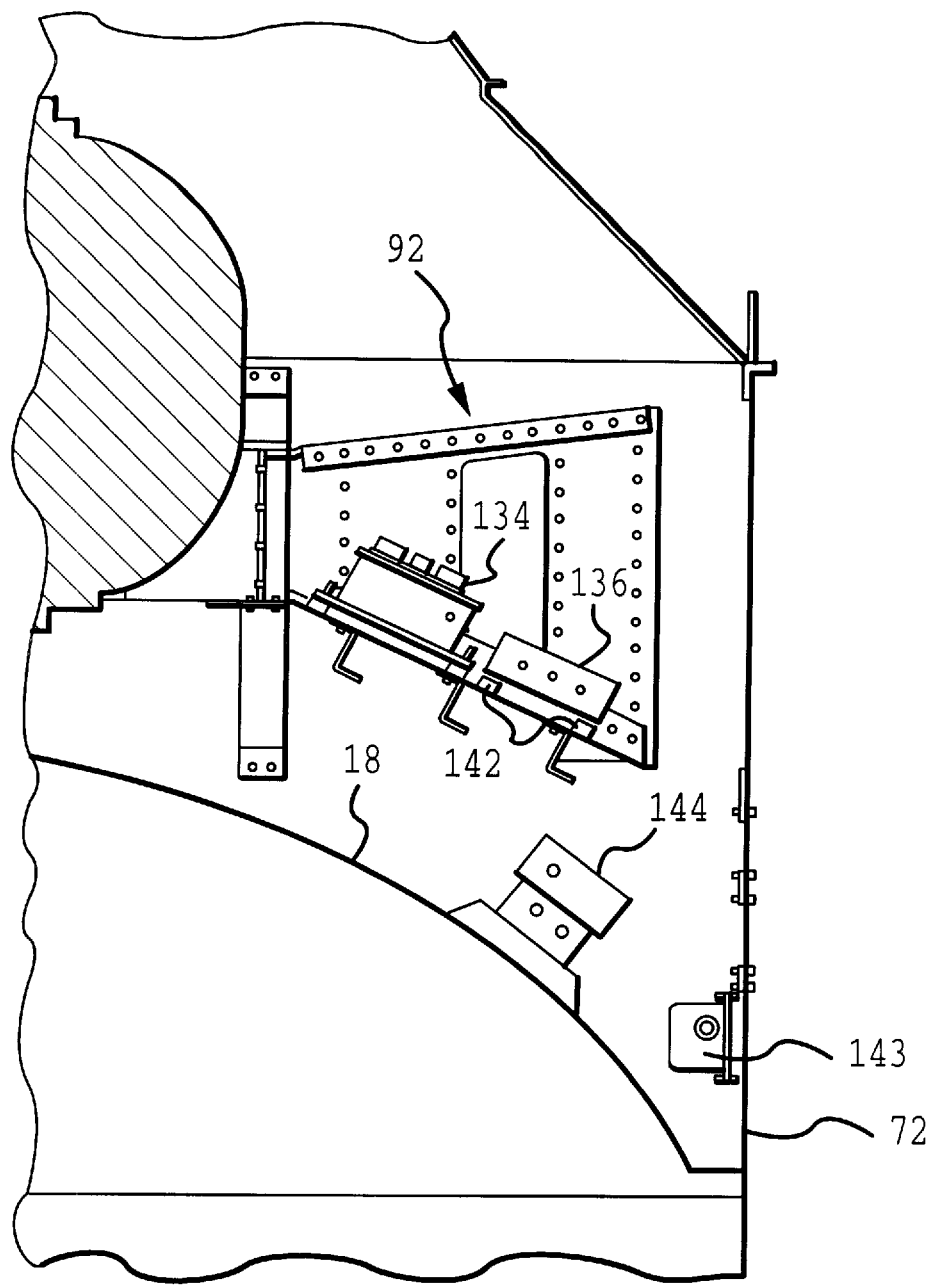
FIG. 16 is a sectional side view of one of the avionic bay areas.
Figure 17:
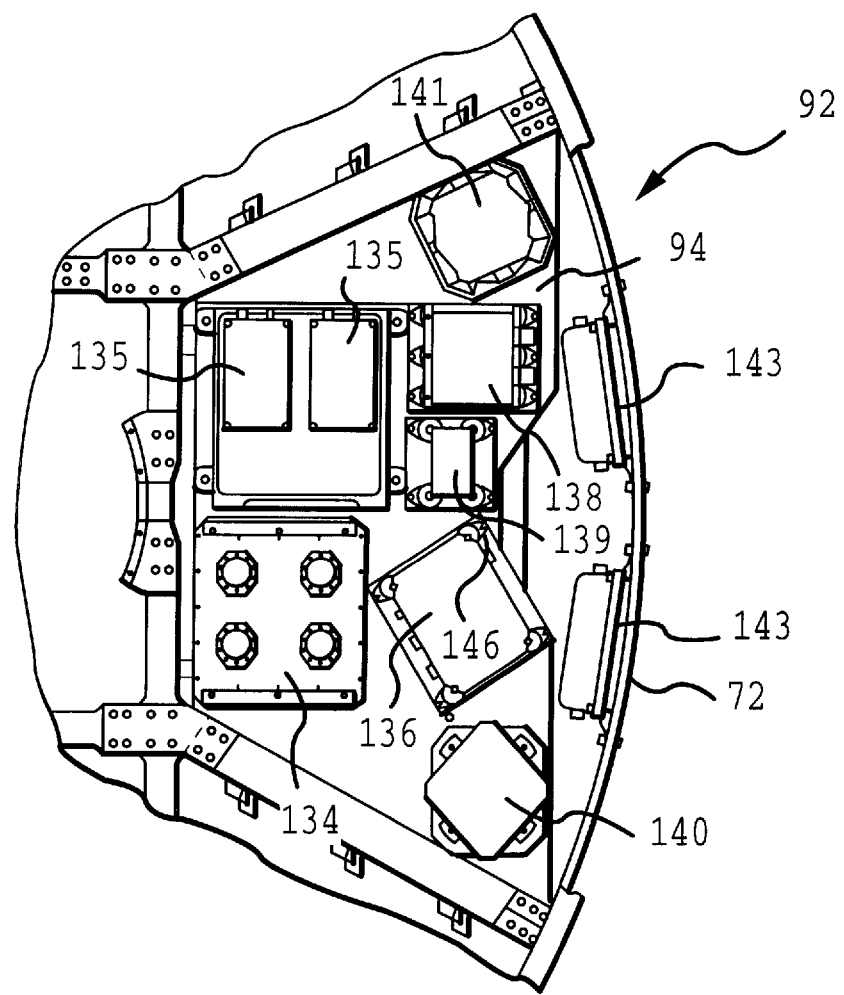
FIG. 17 is a plan view of the avionic bay area of FIG. 16.
Figure 18:
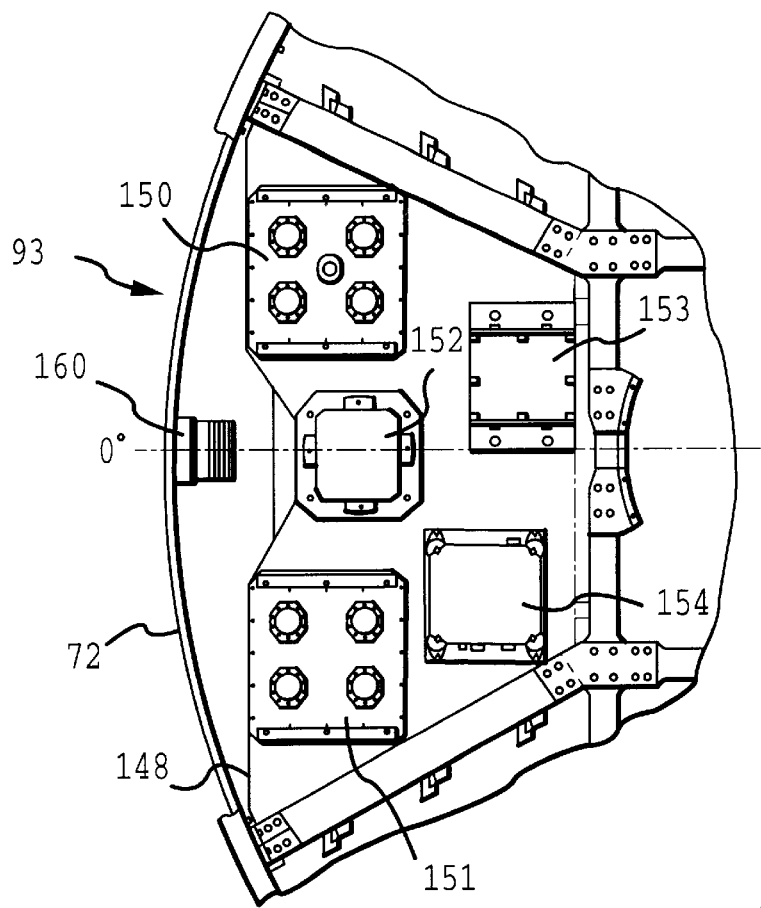
FIG. 18 is a plan view of the other avionic bay area.
Figure 19:
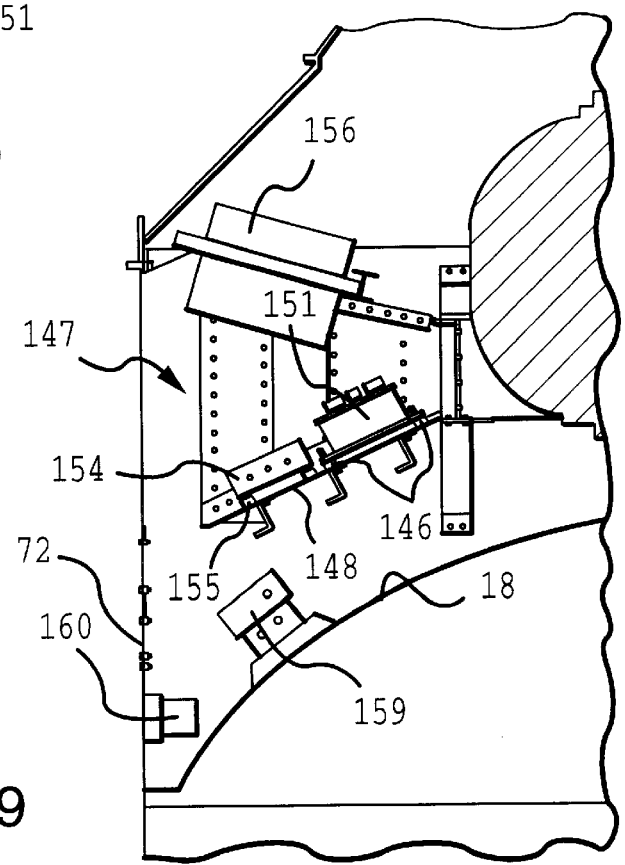
FIG. 19 is a sectional side view of the avionic bay area of FIG. 18.

The electronic layout will now be described with reference to FIGS. 16 to 19. The avionic bay area 92 (shown in greater detail in FIGS. 16 and 17) houses the Channel B destruct interlocks 134, a pair of the telemetry transmitters 135, a command receiver decoder 136 Channel B, the C-band transponder 138 and a master encoder 139. It also includes a C-band battery 140 and a Channel B destruct battery 141. In order to protect the components mounted on the base plate 94 against excessive vibration, they are mounted on shock mountings 142. Secured to the wall 72 are a pair of separation firing units 143. The layout of the various components is clearly illustrated in FIGS. 16 and 17. FIG. 16 further shows the position of a destruct firing unit 144 on the final stage rocket motor 18, and of a separation firing unit 143. The opposite avionic bay area 93 is illustrated in greater detail in FIGS. 18 and 19. FIG. 18 clearly shows the layout of the components on the base plate which is indicated by reference numeral 148. These include an avionic power distribution unit 150, Channel A destruct interlocks 151, a Channel A destruct battery 152, an avionic processor 153 and a command receiver decoder Channel A 154. The components are secured to the base plate 148 by means of shock mountings 155.

Figure 20:
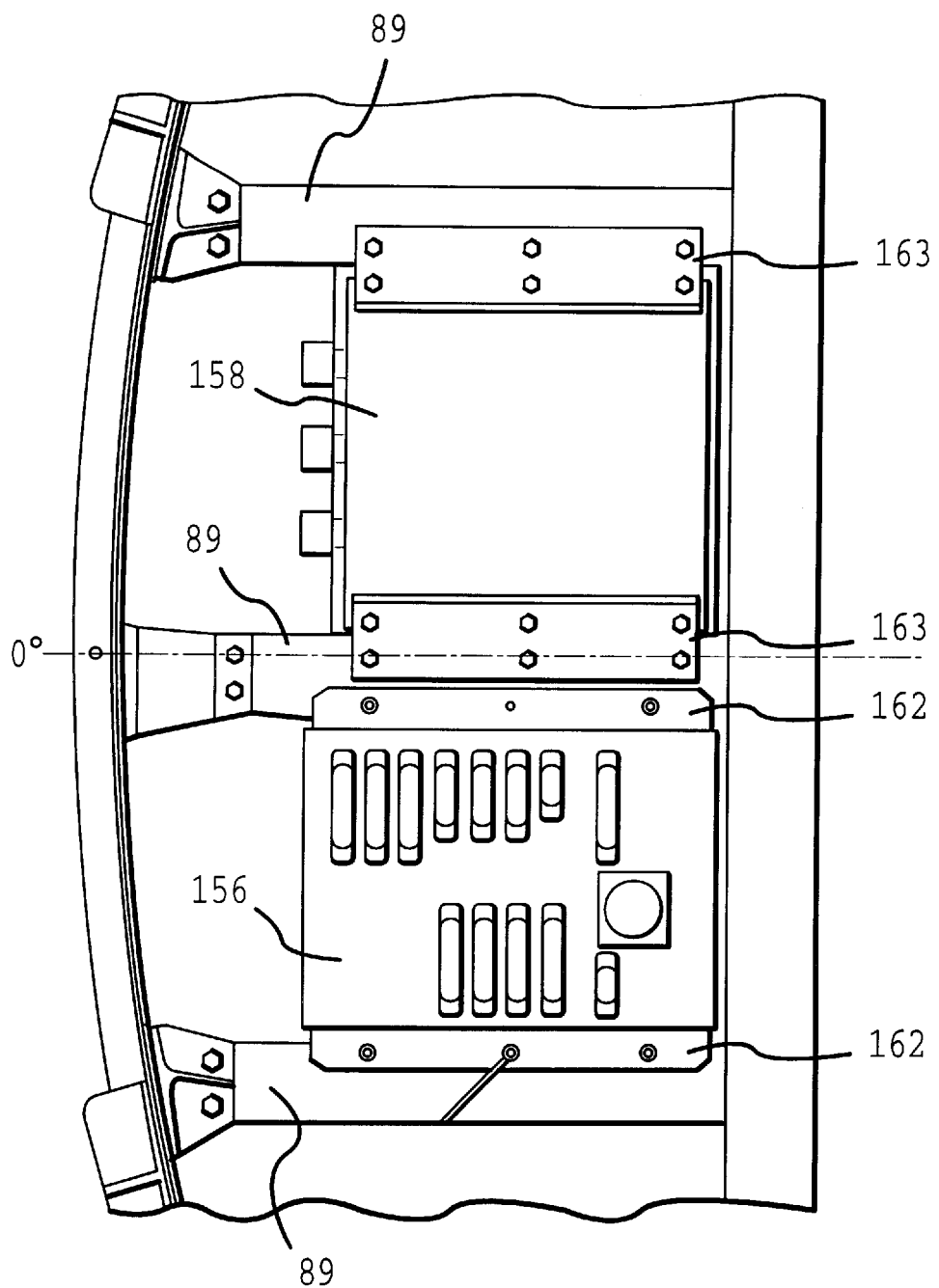
FIG. 20 is a detail plan view of part of an avionic bay area.

Interlocks 156 and an avionic battery 158 are mounted on the upper T-bar of the avionic bay area 93. A destruct firing unit 159 is mounted on the final stage rocket motor 18. A remote encoder 116 is secured to the wall 72. The interlocks 156 and avionic battery 158 are shown in greater detail in FIG. 20. The interlocks 156 and battery 158 are mounted on the three upper T-bars 89 by means of mounting brackets 162 and 163 respectively.

Figure 21:
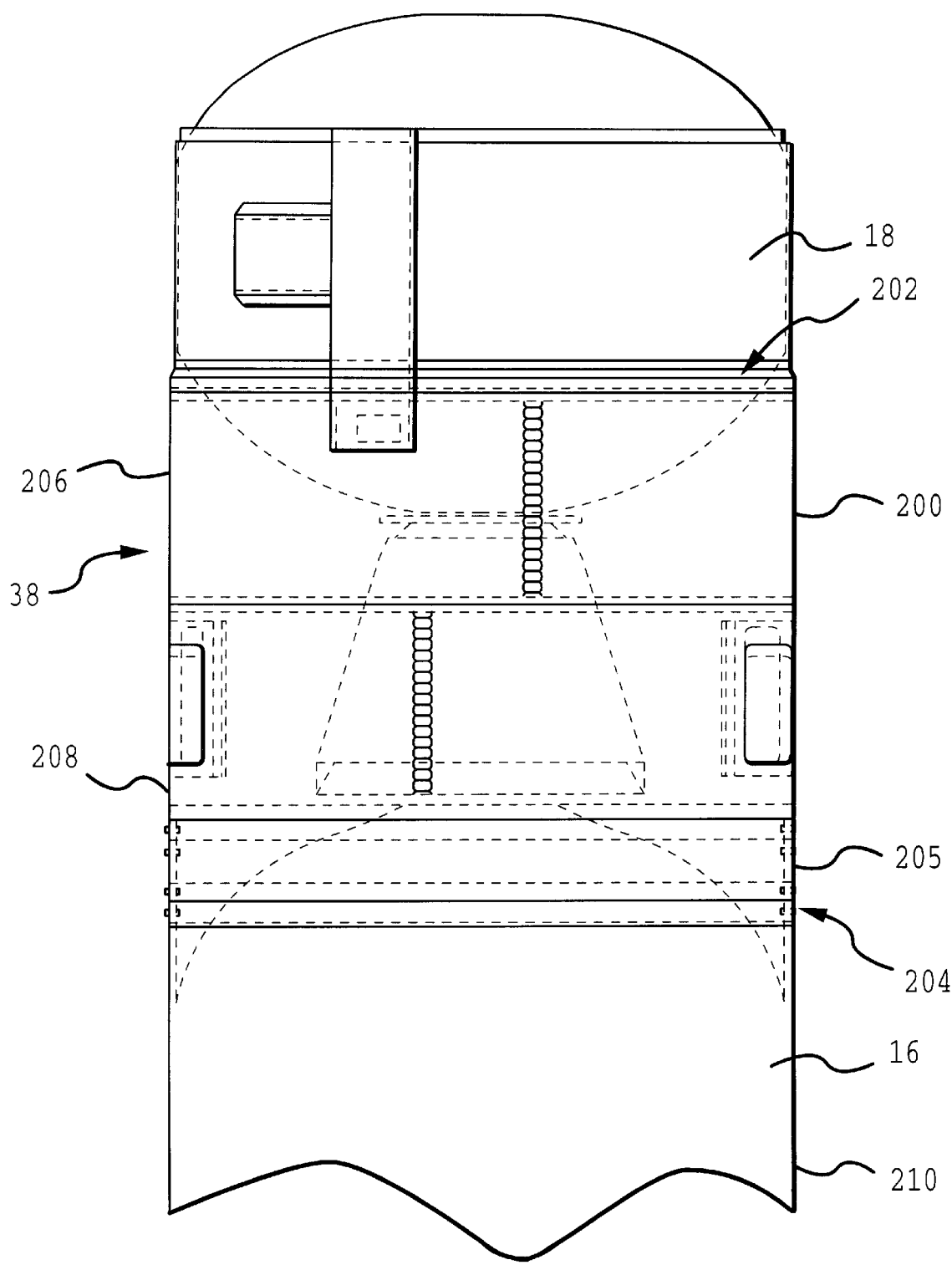
FIG. 21 is a side view of an interstage forming part of the launch vehicle.

The OAM serves to control orbit entry by controlling the firing of the thrusters 108, 109. This function is performed once the final stage rocket motor has been jettisoned. Prior to this, the solid fuel motors are releasably connected to the OAM and are spaced from each other by interstage sections. The first stage 16 is, for instance, spaced from the final stage 18 by means of an interstage section 38. An interstage section is also provided between the final stage 18 and the second stage 24, differing only in length from the interstage 38. This allows the interstages to accommodate different nozzle lengths. Referring to FIG. 21, the interstage 38 comprises a cylindrical tube 200 connected at its leading end, by means of a zip separation joint 202, to the final stage 18. The trailing end of the cylindrical tube 200 is, in turn, connected by means of a non-separable connector to a first stage forward skirt extension 205 which is, in turn, connected to the first stage 16. The cylindrical tube 200 is made of an upper section 206 and a lower section 208, each section comprising three curved aluminum plates secured to each other. The sections 206, 208 are, in turn, riveted to one another.

Figure 22:
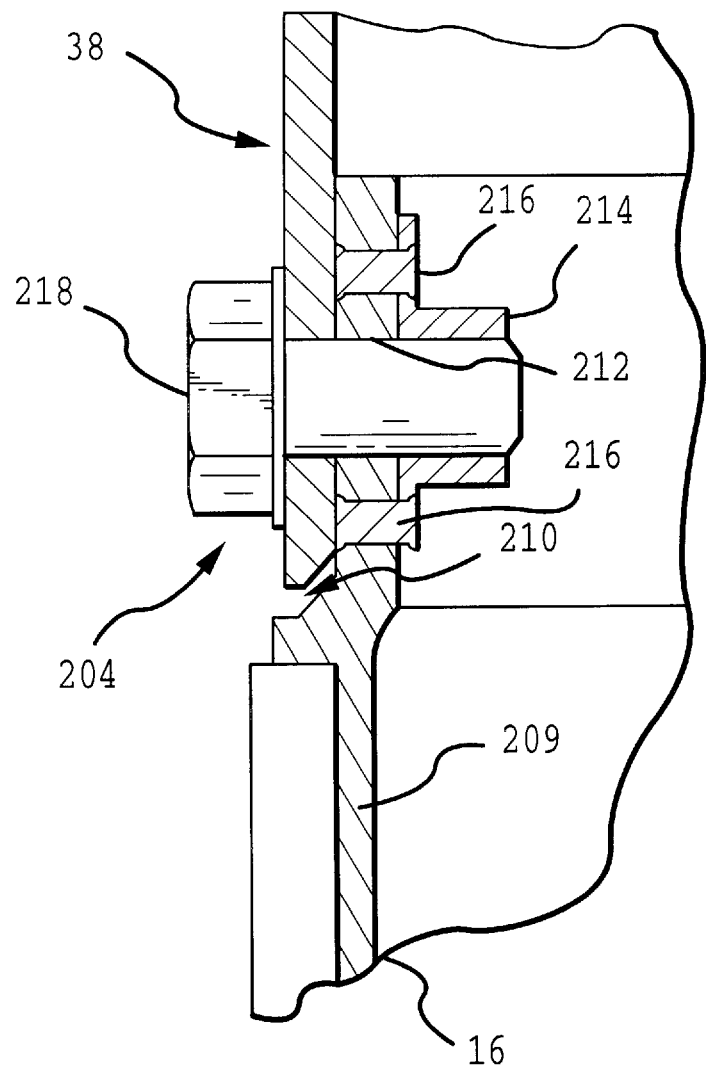
FIG. 22 is a sectional side view of a connector between the leading end of one motor and the trailing end of a forward skirt extension.

The non-separable connector 204 is illustrated in greater detail in FIG. 22. The connector between the first stage and the skirt extension is illustrated in FIG. 22. The wall 209 of the first stage 16 defines a circumferentially extending step 210, received complimentarily by the skirt extension 205. The reduced diameter portion 212 of the wall 208 is provided with a nut 214 secured to its inner wall by means of rivets 216. This allows the skirt extension 205 to be secured to the first stage 16 using bolts 218 (one shown) as illustrated in FIG. 22.

Figure 23:
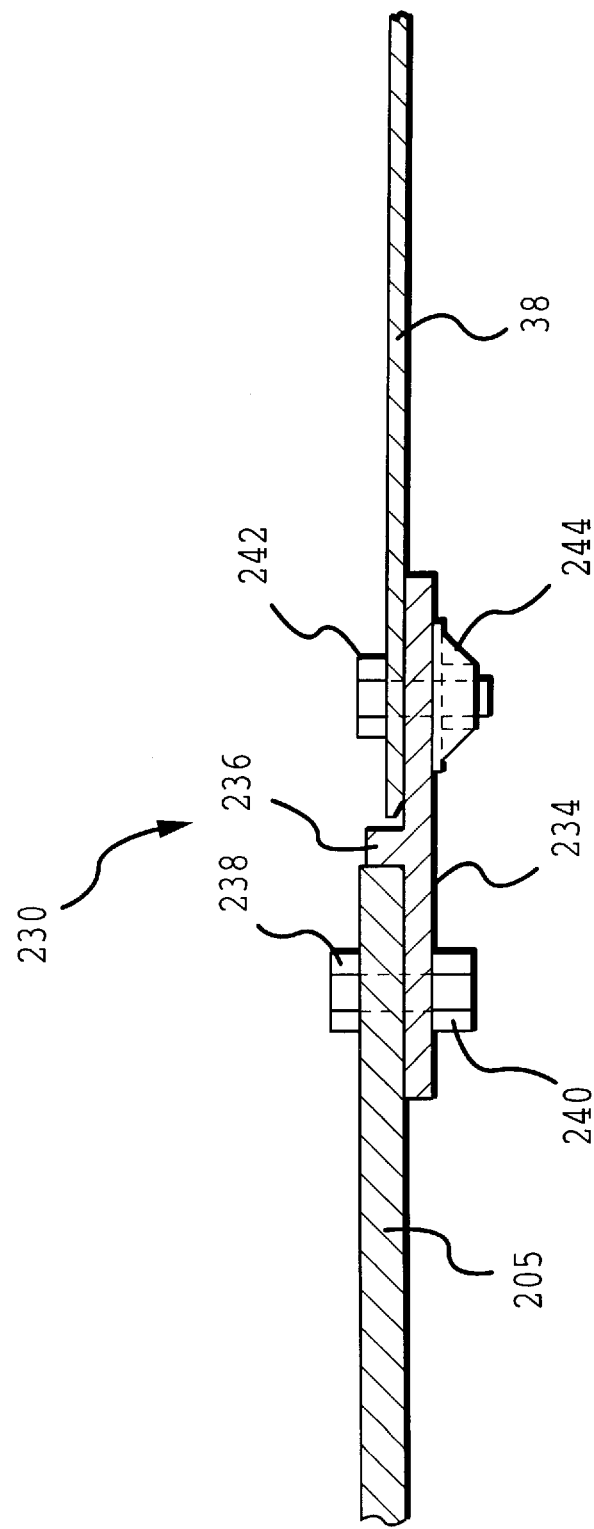
FIG. 23 is a sectional side view of a connection between the leading end of a forward skirt extension and the trailing end of an interstage.

The connection 230 between the skirt extension 205 and the interstage 38 is illustrated in detail in FIG. 23. An annular bracket 234 having a central outwardly extending flange 236 is secured to the skirt extension 205 by means of bolts 238 and nuts 240. The bracket 234 is secured by means of half inch bolts 242 and matching nutplates 244.

Figure 24:
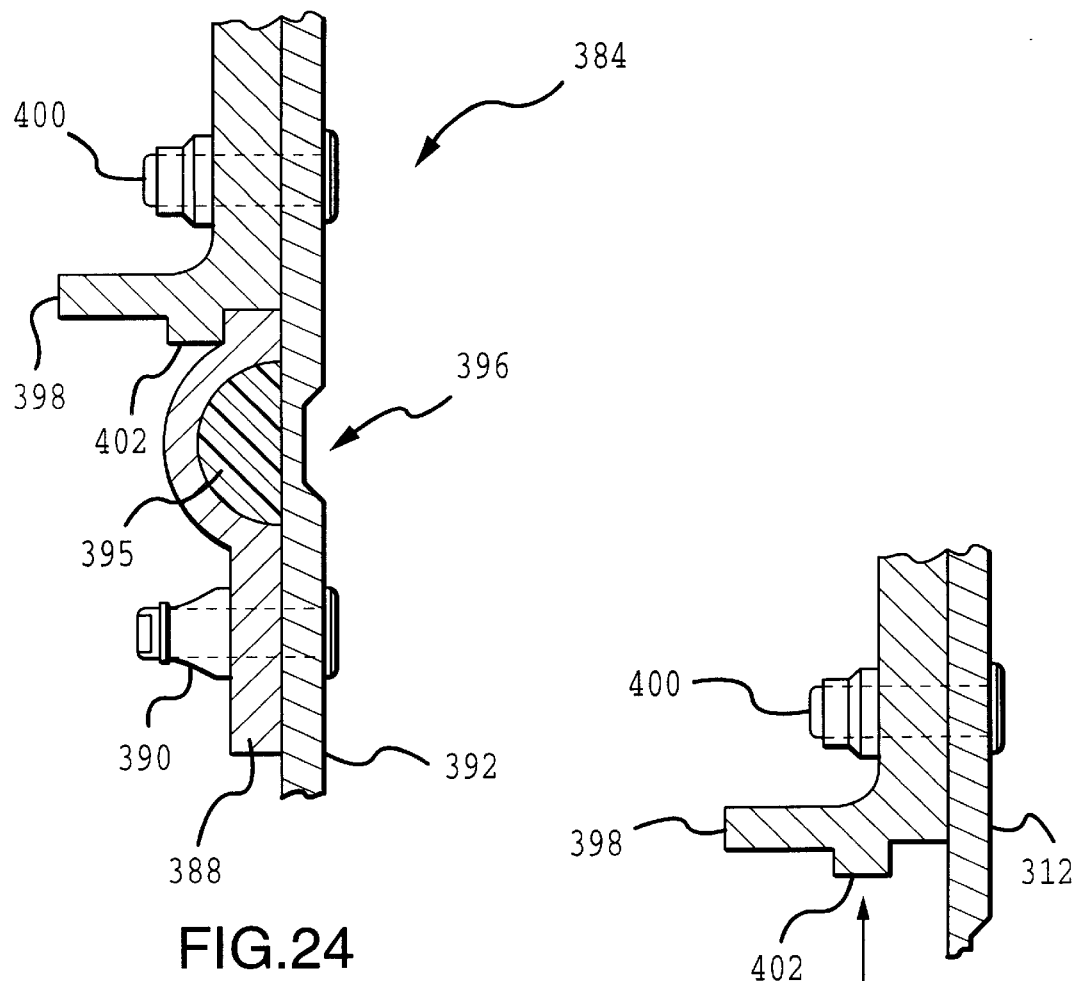
FIG. 24 is a sectional side view of an explosive connector for use with the launch vehicle system of the invention.
Figure 25:
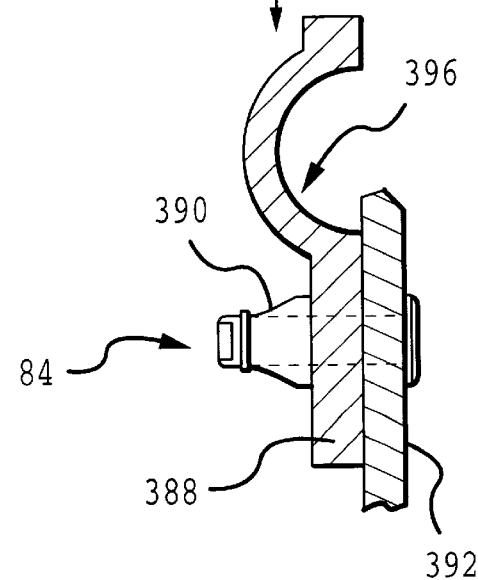
FIG. 25 is a sectional side view of the explosive connector of FIG. 24 showing the connector in a detonated state.

The interstage 38 is connected to the final stage 18 via an explosive seam 384 as illustrated in FIGS. 24 and 25.

The seam 384 simply includes a bracket 388 riveted by means of rivets 390 to a wall 392 which, in this embodiment, constitutes the outer wall of the interstage. The bracket 388 has a concave annular portion to define an annular housing 394 with the wall 392. The housing 394 accommodates explosive material 395. The wall 392 further includes a zone of weakening 396 which ruptures during detonation of the material 395 thereby releasing the bracket 388 and part of the wall 392 from the remaining portion of the wall 392, as shown in FIG. 25. FIGS. 24 and 25 further illustrate an attachment ring 398 riveted by means of rivets 400 (one shown) to the wall 392. The attachment ring 398 is secured to the lower end of the next motor stage (not shown). The ring 398 defines a lip 402 which engages complimentarily with an end portion of the bracket 388.

It will be appreciated that all separable joints in the rocket system which do not require containment of the explosive material can be in the form of a simple joint as, for example, the zip separation joint 384. Thus any separable joints located below the OAM 12 can take the form of the joint as described with respect to FIGS. 24 and 25.

Figure 26:
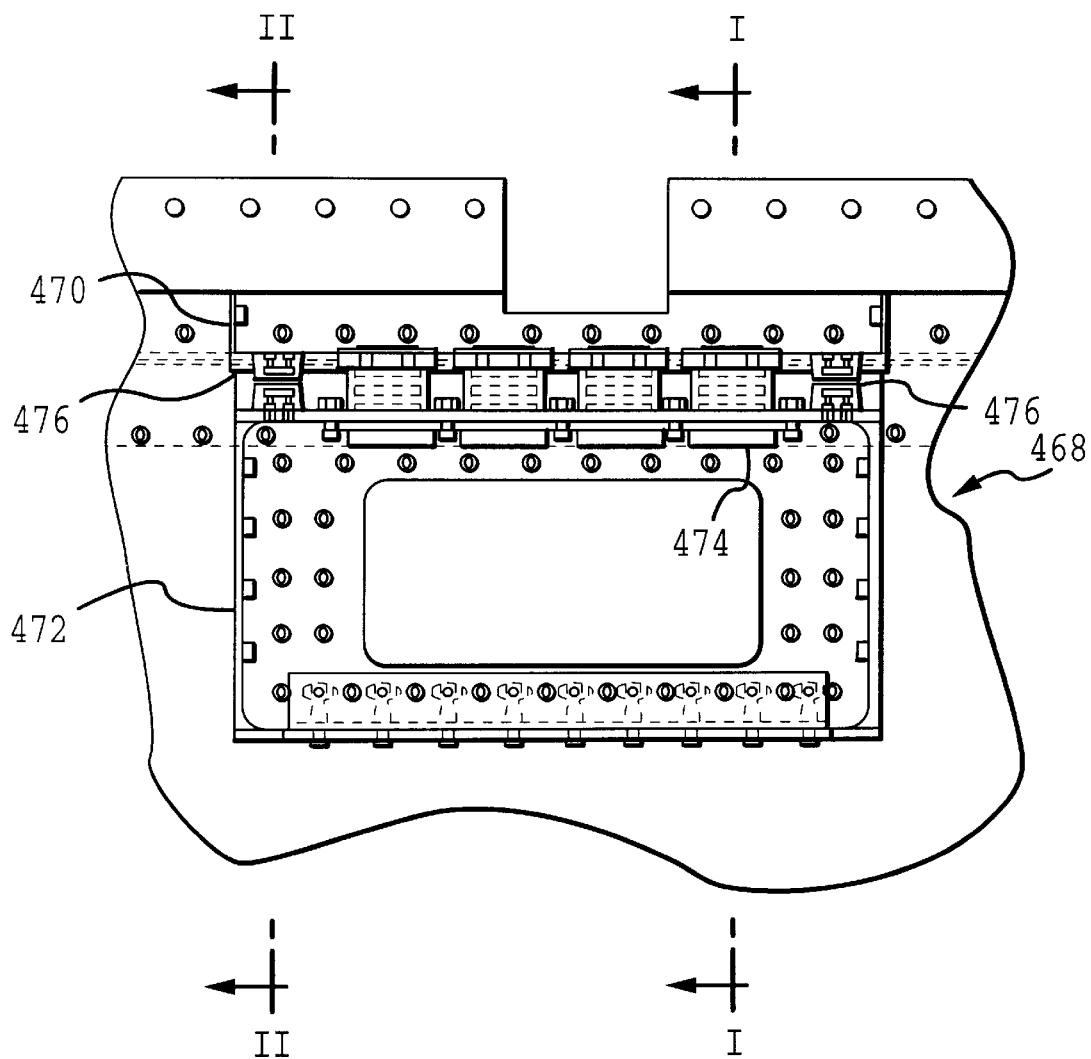
FIG. 26 is a front view of part of a system tunnel of the launch vehicle.
Figure 27:
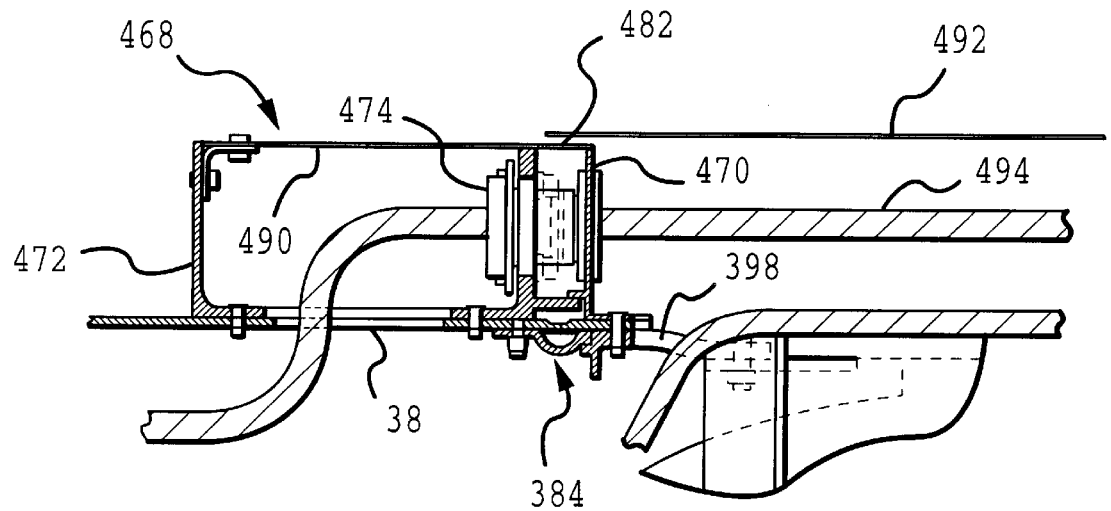
FIG. 27 is a sectional side view along the line I—I in FIG. 26.
Figure 28:
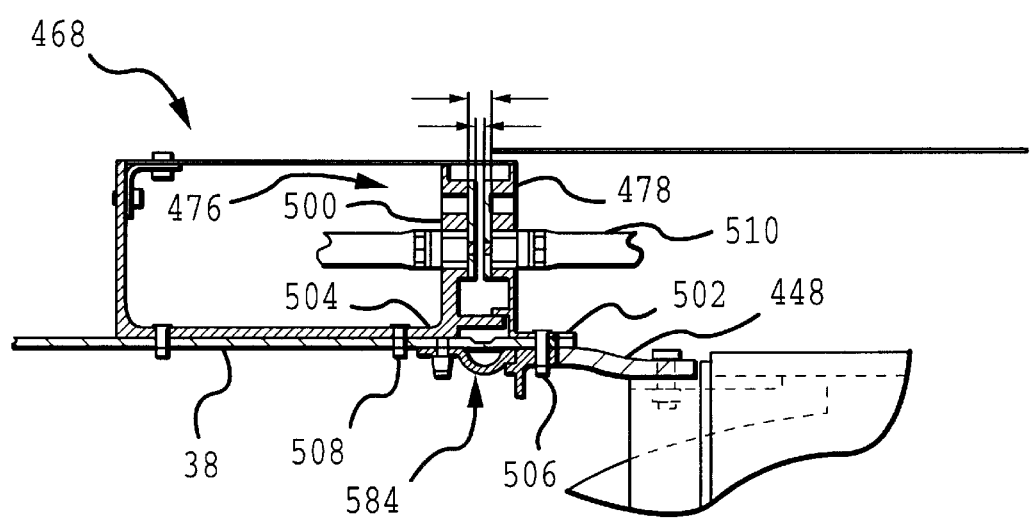
FIG. 28 is a sectional side view along the line II—II in FIG. 26.

Since the interstage is ultimately separated from the final stage, any communication line crossing the explosive seam 384 have to be accommodated to permit separation. Referring to FIG. 26, part of a system tunnel 468 is shown which performs this function. It comprises a forward separation bracket 470 secured to an aft separation bracket 472 by means of four separation connectors 474 which are flanked by a pair of ordnance crossovers 476. A separation connector 474 is shown in FIGS. 27 and 28 which show sectional side views of the explosive seam 384. The separation connector 474 is connected to the ring 398 and to the wall of the interstage 38 by means of the bracket 470 and a bracket 482, respectively. The brackets 470, 482 are riveted to the ring 398 and interstage 38, respectively.

FIG. 27 is a sectional side view through the lower portion of the system tunnel 468 along the line I—I in FIG. 26. An aft cover plate 490 is secured to the aft separation plate 472 to form a lower housing. A forward cover plate 492 in turn forms part of an upper housing of the system tunnel 468. The system tunnel 468 provides a channel for cabling 494.

FIG. 28 shows a sectional side view through the lower portion of the system tunnel 468 along the line II—II in FIG. 26, showing the ordnance crossover 476 in greater detail. The ordnance crossover 476 comprises an upper portion 498 and an opposed lower portion 500. The portions 498 and 500 extend into the brackets 470 and 482 respectively.

Figure 29:
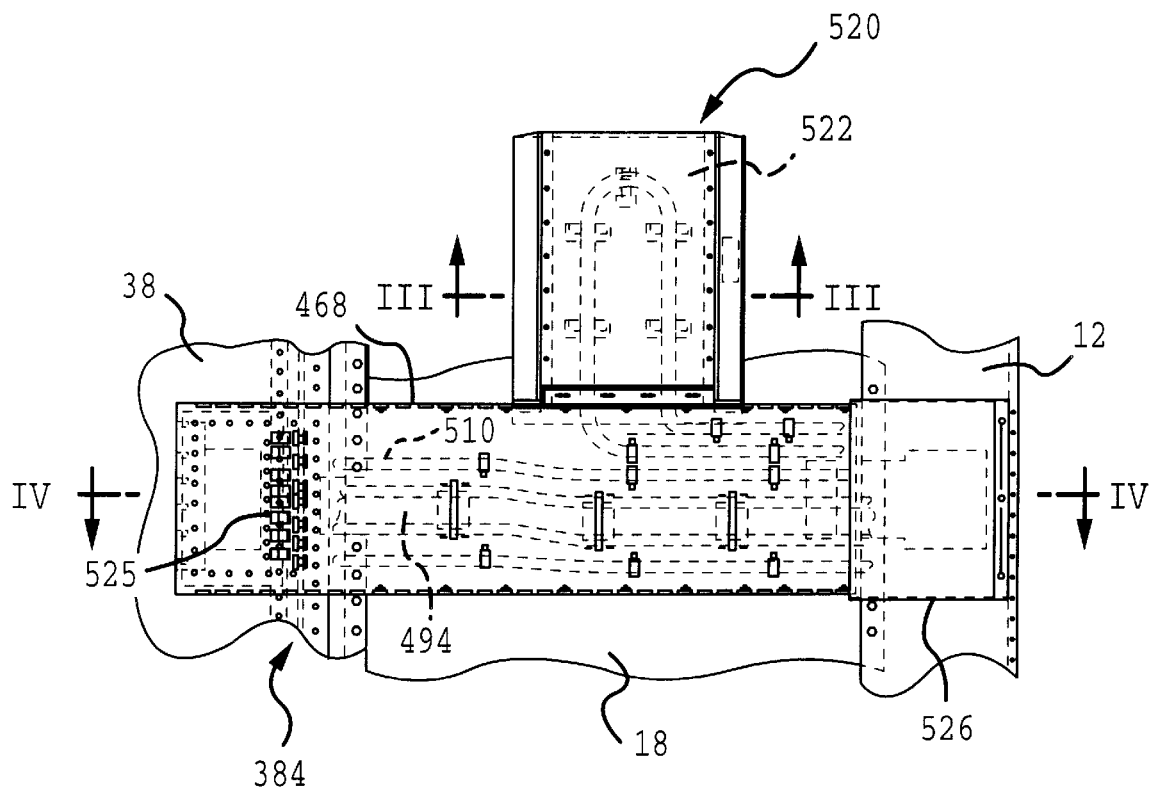
FIG. 29 is a plan view of the entire system tunnel.
Figure 30:
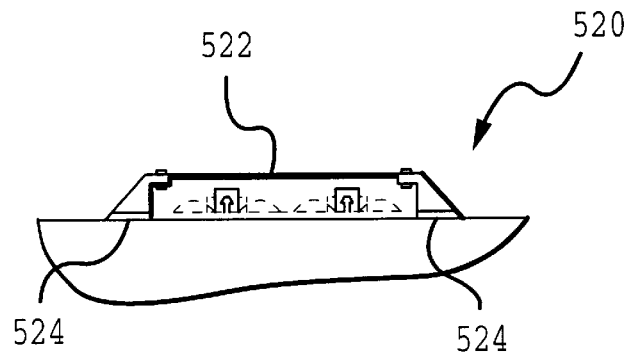
FIG. 30 is a sectional side view along the line III—III in FIG. 29.
Figure 31:
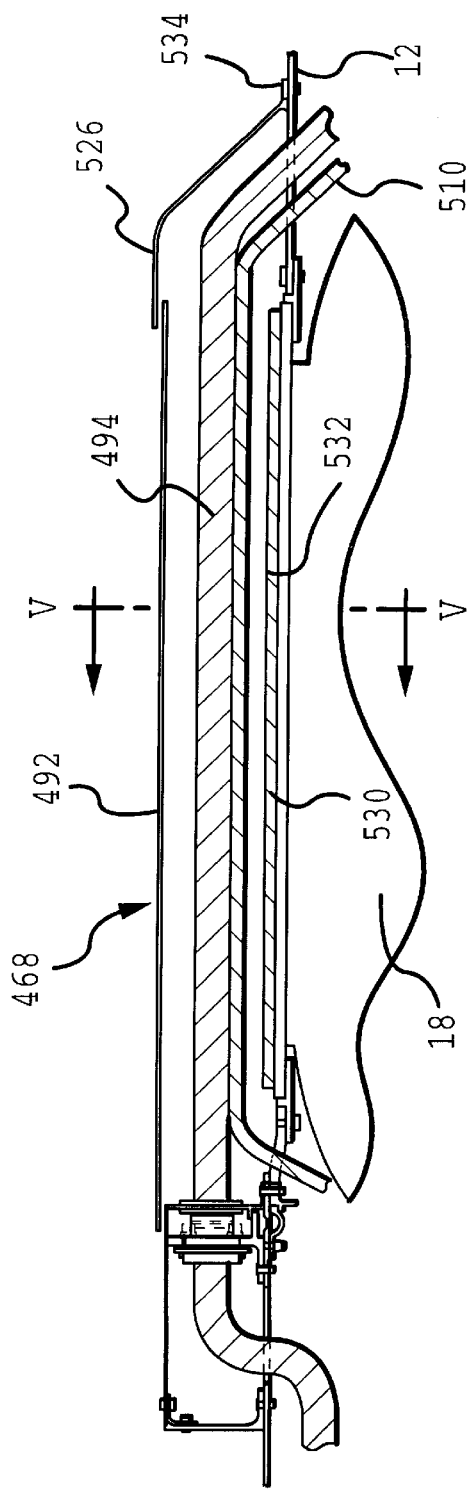
FIG. 31 is a sectional side view through the system tunnel along the line IV—IV in FIG. 29.
Figure 32:
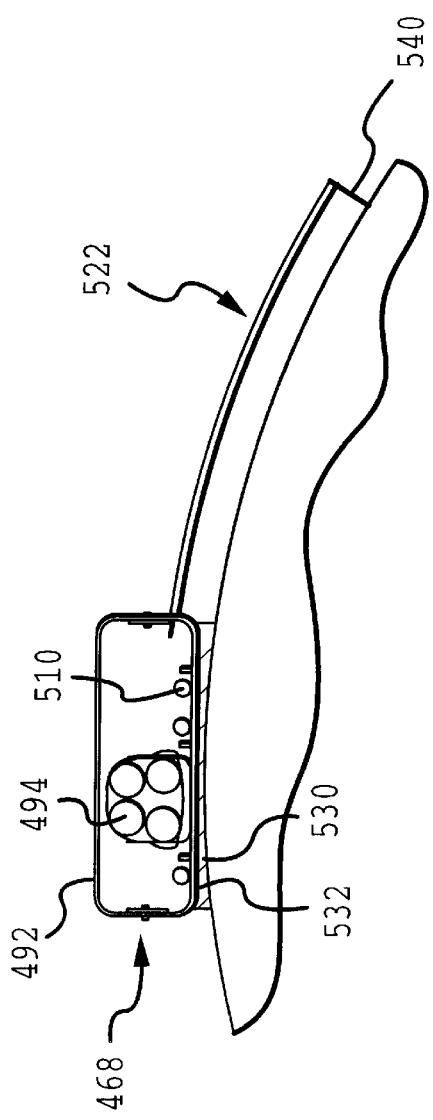
FIG. 32 is a sectional end view along the line V—V in FIG. 31.

Referring to FIG. 29, the system tunnel 468 extends from the interstage 38 across the final stage motor 18 to the orbital assist module 12. The system tunnel 468 provides a routing path for the cabling 494 and ordinance lines 510. An FTS section extends laterally outwardly as indicated in FIG. 29. The FTS section 520 includes a cover 522. FIG. 30 shows the FTS section 522 in cross section along the line III—III in FIG. 29. The cover 522 is secured by means of vulcanized rubber motor case bonds 524. The system tunnel 468 interfaces separation connectors 525 at the aft end with the OAM tunnel closeout 526 at the forward end. The closeout 526 includes the separation connectors 525 which are described in greater detail below. A sectional side view of the system tunnel 468 along the line IV—IV in FIG. 29 is shown in FIG. 31. A vulcanized rubber motor case bond 530 secures a tunnel base plate 532 to the outer wall of the final stage 18. The tunnel closeout 526 comprises a cover which is secured to the wall of the OAM 12 by means of rivets 534. FIG. 32 illustrates a section along the line V—V in FIG. 31. This shows the system tunnel cover 492 which forms a housing around the cabling 494, 510. The FTS section 520 is shown extending laterally, being enclosed by the FTS cover 522 and an FTS end plate 540.

It will be appreciated that the above embodiments are merely illustrative examples and that the invention is not in any way limited to the specific embodiments.

The invention claimed is:

1. An orbital assist module for a launch vehicles which includes a cylindrical outer wall;
   a support structure secured to an inner surface of the cylindrical outer wall and defining a plurality of fuel tank supporting zones;
   at least one fuel tank securable in a fuel tank supporting zone, each fuel tank supporting zone defining securing formations for complementarily receiving said fuel tank, wherein said fuel tank has a substantially circular cross-section, wherein the support structure includes at least two rows of at least three supporting zones, and wherein the securing formations for each supporting zone comprise four support plates having concave inner edges for complementarily engaging said fuel tank;
   a plurality of nozzles connected to the at least one fuel tank by means of fuel lines; and
   a plurality of valves mounted in the fuel lines.

2. An orbital assist module of claim 1, in which the support structure includes a rectangular frame forming a support base, and securing brackets extending outwardly from the frame, in which the frame is secured to the inner surface of the cylindrical outer wall by means of the brackets.

3. An orbital assist module of claim 2, wherein avionic bay areas are defined between the securing brackets for housing a guidance, navigation and control system.

4. A method for assembling an orbital assist module for a launch vehicle, comprising the steps of:
   securing support structure within a cylindrical outer wall, said support structure for supporting at least one fuel tank, wherein said support structure includes at least two rows of at least three fuel tank supporting zones, said fuel tank supporting zones defining securing formations of four support plates having concave inner brackets for engaging the at least one fuel tank; and
   symmetrically positioning, about a first longitudinally extending axis of the orbital assist module, at least 2×N of said fuel tanks in 2×N of said fuel tank supporting zones, wherein N is an integer greater than or equal to 1, to provide the orbital assist module with a center of gravity located substantially along the first longitudinally extending axis.

5. An orbital assist module of claim 1, wherein each tank is made of spun aluminum with a graphite composite overwrap, the tank containing an elastomeric bladder for containing the fuel, and wherein the tank is pressurized with gaseous nitrogen for positive expulsion of the fuel.

6. An orbital assist module of claim 5, wherein the fuel comprises hydrazine.

7. An orbital assist module of claim 1, wherein the nozzles include downwardly directed axial thrustor nozzles for velocity addition to the launch vehicle, and outwardly directed thrustor nozzles for pitch, roll and yaw control of the launch vehicle.

8. An orbital assist module of claim 7, wherein the axial thrustor nozzles are 50 lbf thrusters and the outwardly directed thrustor nozzles are 25 lbf thrustors.

9. An orbital assist module of claim 1, which includes a service valve panel comprising a plurality of valves connected to the tanks by means of pipes.

10. A method, as claimed in claim 4, wherein said symmetrically positioning step includes the steps of positioning at least a first of said fuel tanks in a first row of said at least three fuel tank supporting zones and positioning at least a second of said fuel tanks in a second row of said at least three fuel tank supporting zones, opposite said first fuel tank.

11. A method, as claimed in claim 4, wherein said symmetrically positioning step includes the step of selecting at least a first and a second of said fuel tank supporting zones, wherein said first fuel tank supporting zone is symmetric to said second fuel tank supporting zone, relative to the first longitudinally extending axis of the orbital assist module.

12. A method, as claimed in claim 11, wherein said first and second fuel tank positioned in said first and second fuel tank supporting zones are interposed between third and fourth fuel tank supporting zones and fifth and sixth fuel tank supporting zones, respectively.

13. A method, as claimed in claim 4, wherein N=2, wherein said symmetrically positioning step includes the step of selecting a first, second, third and fourth of said fuel tank supporting zones for complimentarily supporting a first, second, third and fourth of said fuel tanks, wherein said first and second fuel tank supporting zones are symmetric to said third and forth fuel tank supporting zones, relative to the first longitudinally extending axis of the orbital assist module, wherein at least a fifth and sixth of said fuel tank supporting zones are interposed between said first and second fuel tank supporting zones and said third and fourth fuel tank supporting zones, respectively.

14. A method, as claimed in claim 4, wherein N=3, wherein said symmetrically positioning step includes the step of selecting a first, second, third, fourth, fifth and sixth of said fuel tank supporting zones for complimentarily supporting a first, second, third, fourth, fifth and sixth of said fuel tanks, wherein said first, second and third fuel tank supporting zones are symmetric to said fourth, fifth and sixth fuel tank supporting zones, relative to the first longitudinally extending axis of the orbital assist module.

15. A method, as claimed in claim 4, further comprising the steps of:

connecting a plurality of nozzles to said fuel tanks with at least one fuel line; and mounting at least one valve in the at least one fuel line.

16. A method, as claimed in claim 4, further comprising the step of:

pressurizing at least one of said fuel tanks with gaseous nitrogen for positive expulsion of fuel contained within said fuel tank.

17. A method, as claimed in claim 4, wherein said symmetrically positioning step comprises the step of maintaining the center of gravity of the orbital assist module substantially along said first longitudinally extending axis of the orbital assist module.

* * * * *